US 9,840,438 B2

(12) United States Patent
Castle et al.

(10) Patent No.: US 9,840,438 B2
(45) Date of Patent: Dec. 12, 2017

(54) ANTIMICROBIAL ARTICLE WITH FUNCTIONAL COATING AND METHODS FOR MAKING THE ANTIMICROBIAL ARTICLE

(71) Applicant: CORNING INCORPORATED, Corning, NY (US)

(72) Inventors: Thomas Michael Castle, Horseheads, NY (US); Georgiy M Guryanov, Horseheads, NY (US); Ekaterina Aleksandrovna Kuksenkova, Painted Post, NY (US); Florence Christine Monique Verrier, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 79 days.

(21) Appl. No.: 14/692,150

(22) Filed: Apr. 21, 2015

(65) Prior Publication Data
US 2015/0307392 A1 Oct. 29, 2015

Related U.S. Application Data

(60) Provisional application No. 61/984,174, filed on Apr. 25, 2014.

(51) Int. Cl.
*C03C 21/00* (2006.01)
*C03C 17/28* (2006.01)
(Continued)

(52) U.S. Cl.
CPC ............ *C03C 21/005* (2013.01); *C03C 3/091* (2013.01); *C03C 17/30* (2013.01); *C03C 21/002* (2013.01);
(Continued)

(58) Field of Classification Search
None
See application file for complete search history.

(56) References Cited

U.S. PATENT DOCUMENTS 3,549,344 A  12/1970  Loukes et al.
5,078,772 A   1/1992  Asahara et al.
(Continued)

FOREIGN PATENT DOCUMENTS

AU  2012263664  1/2013
CN     1856453  11/2006
(Continued)

OTHER PUBLICATIONS

Patent Cooperation Treaty International Notification of Transmittal of the International Search Report and the Written Opinion of the International Searching Authority, international application No. PCT/US2015/027209; dated Aug. 5, 2015, 9 pages.

*Primary Examiner* — David Sample
(74) *Attorney, Agent, or Firm* — Kevin M. Johnson

(57) ABSTRACT

A method of making an antimicrobial article including the steps: providing an article having a first surface and ion-exchangeable metal ions, a strengthening bath comprising ion-exchanging metal ions larger in size than the ion-exchangeable metal ions, and an antimicrobial bath comprising antimicrobial ions, ion-exchangeable metal ions and ion-exchanging ions; submersing the article in the strengthening bath to exchange ion-exchangeable metal ions with ion-exchanging metal ions in the strengthening bath to form a compressive stress region extending from the first surface to a first depth; forming a layer on the first surface arranged over the compressive stress region and defining a second surface; and submersing the article and the layer in the antimicrobial bath to exchange ion-exchangeable and ion-exchanging metal ions in the compressive stress region with
(Continued)

antimicrobial ions to impart an antimicrobial region with antimicrobial ions extending from the second surface of the layer to a second depth.

18 Claims, 9 Drawing Sheets

(51) Int. Cl.
  *C03C 17/30* (2006.01)
  *C03C 3/091* (2006.01)

(52) U.S. Cl.
  CPC ...... *C03C 2204/02* (2013.01); *C03C 2217/76* (2013.01); *C03C 2218/32* (2013.01)

(56) References Cited

U.S. PATENT DOCUMENTS

| | | |
|---|---|---|
| 5,151,958 A | 9/1992 | Honkanen |
| 5,700,842 A | 12/1997 | Cole |
| 6,921,546 B2 | 7/2005 | Albach |
| 7,232,777 B1 | 6/2007 | Van Hyning |
| 8,034,732 B2 | 10/2011 | Kobayashi et al. |
| 8,232,218 B2 | 7/2012 | Dejneka et al. |
| 8,312,739 B2 | 11/2012 | Lee et al. |
| 8,561,429 B2 | 10/2013 | Allan et al. |
| 8,586,492 B2 | 11/2013 | Barefoot et al. |
| 9,156,724 B2 | 10/2015 | Gross |
| 9,346,703 B2 | 5/2016 | Bookbinder et al. |
| 9,517,967 B2 | 12/2016 | Dejneka et al. |
| 2002/0127399 A1 | 9/2002 | Mankell et al. |
| 2003/0064224 A1 | 4/2003 | Mankell et al. |
| 2004/0166173 A1 | 8/2004 | Albach |
| 2006/0142413 A1 | 6/2006 | Zimmer et al. |
| 2007/0172661 A1 | 7/2007 | Fechner et al. |
| 2008/0063728 A1 | 3/2008 | Fechner et al. |
| 2008/0190140 A1 | 8/2008 | Selig |
| 2009/0142568 A1 | 6/2009 | Dejneka et al. |
| 2009/0220761 A1 | 9/2009 | Dejneka et al. |
| 2010/0004111 A1 | 1/2010 | Kobayashi et al. |
| 2010/0009154 A1 | 1/2010 | Allan et al. |
| 2010/0028607 A1 | 2/2010 | Lee et al. |
| 2010/0035038 A1 | 2/2010 | Barefoot et al. |
| 2010/0071415 A1 | 3/2010 | Voss et al. |
| 2011/0081542 A1 | 4/2011 | Pilloy et al. |
| 2011/0293942 A1 | 12/2011 | Cornejo et al. |
| 2012/0034435 A1 | 2/2012 | Borrelli et al. |
| 2012/0040193 A1 | 2/2012 | Rajala |
| 2012/0052271 A1 | 3/2012 | Gomez et al. |
| 2012/0216569 A1 | 8/2012 | Allan et al. |
| 2012/0219792 A1 | 8/2012 | Yamamoto et al. |
| 2012/0297829 A1* | 11/2012 | Endo ............... C03C 3/085 65/30.14 |
| 2013/0130023 A1 | 5/2013 | Boulanger et al. |
| 2013/0219965 A1 | 8/2013 | Allan et al. |
| 2013/0224492 A1 | 8/2013 | Bookbinder et al. |
| 2014/0092377 A1 | 4/2014 | Liu et al. |
| 2014/0118740 A1 | 5/2014 | Fontaine et al. |
| 2014/0227524 A1 | 8/2014 | Ellison et al. |
| 2014/0345325 A1 | 11/2014 | Allan et al. |
| 2015/0147574 A1 | 5/2015 | Allan et al. |
| 2015/0147775 A1 | 5/2015 | Fiacco et al. |

FOREIGN PATENT DOCUMENTS

| | | |
|---|---|---|
| CN | 101389577 | 5/2011 |
| DE | 102005039298 | 2/2007 |
| EP | 250635 | 12/1990 |
| EP | 858259 | 7/2001 |
| EP | 942351 B | 4/2003 |
| EP | 1343732 | 9/2003 |
| EP | 1270527 | 2/2005 |
| EP | 1667940 | 6/2006 |
| EP | 1667941 | 5/2007 |
| EP | 2064220 | 10/2010 |
| JP | 6100329 | 4/1994 |
| JP | 9067143 | 3/1997 |
| JP | 10158037 | 6/1998 |
| JP | 11060270 | 3/1999 |
| JP | 11060277 | 3/1999 |
| JP | 11228186 | 8/1999 |
| JP | 11319042 | 11/1999 |
| JP | 2000053451 | 2/2000 |
| JP | 2000072483 | 3/2000 |
| JP | 2000072487 | 3/2000 |
| JP | 2000203876 | 7/2000 |
| JP | 2001026466 | 1/2001 |
| JP | 200180941 | 3/2001 |
| JP | 2001097735 | 4/2001 |
| JP | 03218096 | 10/2001 |
| JP | 03248279 | 1/2002 |
| JP | 03486951 | 1/2004 |
| JP | 04052836 | 2/2008 |
| JP | 04212642 | 1/2009 |
| JP | 2010138025 | 6/2010 |
| JP | 2011133800 | 7/2011 |
| JP | 2011241107 | 12/2011 |
| JP | 04916503 | 4/2012 |
| JP | 2012079133 | 4/2012 |
| JP | 05085803 | 11/2012 |
| JP | 2012214381 | 11/2012 |
| JP | 2013071878 | 4/2013 |
| KR | 2009026192 | 3/2009 |
| KR | 1174402 | 8/2012 |
| KR | 2012117495 | 10/2012 |
| KR | 1268956 | 5/2013 |
| WO | 9716065 | 5/1997 |
| WO | 0249981 A2 | 6/2002 |
| WO | 2005030665 | 4/2005 |
| WO | 2005033034 A1 | 4/2005 |
| WO | 2005042437 A2 | 5/2005 |
| WO | 2005108316 | 11/2005 |
| WO | 2006058906 | 6/2006 |
| WO | 2007108245 | 9/2007 |
| WO | 2005042437 | 8/2009 |
| WO | 2011065293 | 6/2011 |
| WO | 2011069338 | 6/2011 |
| WO | 2011145592 | 11/2011 |
| WO | 2012019067 | 2/2012 |
| WO | 2012135294 | 10/2012 |
| WO | 2013055994 | 4/2013 |

* cited by examiner

ANTIMICROBIAL ARTICLE WITH FUNCTIONAL COATING AND METHODS FOR MAKING THE ANTIMICROBIAL ARTICLE

This application claims the benefit of priority under 35 U.S.C. §119 of U.S. Provisional Application Ser. No. 61/984,174 filed on Apr. 25, 2014 the content of which is relied upon and incorporated herein by reference in its entirety.

BACKGROUND

The present invention generally relates to strengthened, antimicrobial articles with functional coatings and methods for making them for various applications including, but not limited to, touch screens for various electronic devices, e.g., mobile phones, laptop computers, book readers, hand-held video gaming systems, and automated teller machines.

Ion-exchange processes can be used to impart both antimicrobial and strength-enhancing properties in a glass, glass-ceramic or ceramic article by injecting certain metal ions. Antimicrobial properties, for example, can be developed by injecting $Ag^+$ ions into a surface region of the article. The $Ag^+$ ions in the surface region of the article interact with microbes at the surface of the article to kill them or otherwise inhibit their growth. However, the presence and development of these $Ag^+$ ions in the surface region of the article can alter the optical clarity, coloration and/or significantly increase the manufacturing costs of the article.

Accordingly, there is a need for new processes, and particular article configurations, for making strengthened, antimicrobial article products that maximize optical clarity, coloration stability and/or antimicrobial efficacy in a cost effective manner.

SUMMARY

According to one embodiment, an antimicrobial article is provided that includes a substrate having a first surface; a layer disposed on the first surface, the layer defining a second surface; a compressive stress region extending from the first surface of the substrate to a first depth in the substrate; and an antimicrobial region comprising a plurality of $Ag^+$ ions extending from the second surface of the layer to a second depth in the substrate, the second depth at approximately 3 µm or less from the first surface of the substrate. The first surface of the substrate has a concentration of $Ag^+$ ions in the range from about 1% by weight to about 50% by weight.

In some embodiments, the majority of the plurality of $Ag^+$ ions extending from the second surface of the layer to a second depth in the substrate is in a non-reduced state.

In another set of embodiments, the substrate is primarily composed of a glass, glass-ceramic or ceramic composition. The layer can include an anti-smudge coating, an anti-fingerprint coating, and/or an easy-to-clean coating. The layer can also be characterized as a hydrophobic coating. According to some embodiments, the substrate and the layer are each characterized by an optical transmittance of 88% or greater in the range of about 400 nm to 750 nm.

According to a further embodiment, an antimicrobial article is provided that includes a substrate having a first surface; a layer disposed on the first surface, the layer defining a second surface; a compressive stress region extending from the first surface of the substrate to a first depth in the substrate; and an antimicrobial region comprising a plurality of $Ag^+$ ions extending from the second surface of the layer to a second depth in the layer. The second surface of the layer has a concentration of $Ag^+$ ions in the range from about 1% by weight to about 50% by weight.

In another aspect of the disclosure, a method of making an antimicrobial article is provided that includes the steps: providing an article having a first surface and a plurality of ion-exchangeable metal ions; providing a strengthening bath comprising a plurality of ion-exchanging metal ions larger in size than the ion-exchangeable metal ions; and providing an antimicrobial bath comprising a plurality of antimicrobial ions, a plurality of the ion-exchangeable metal ions and a plurality of the ion-exchanging ions. The method also includes the steps: submersing the article in the strengthening bath to exchange a portion of the plurality of ion-exchangeable metal ions in the article with a portion of the plurality of the ion-exchanging metal ions in the strengthening bath to form a compressive stress region extending from the first surface to a first depth in the article; forming a layer on the first surface of the article, the layer arranged over the compressive stress region and defining a second surface; and submersing the article and the layer in the antimicrobial bath to exchange a portion of the ion-exchangeable and the ion-exchanging metal ions in the compressive stress region with a portion of the plurality of antimicrobial ions in the antimicrobial bath to impart an antimicrobial region comprising a plurality of antimicrobial ions extending from the second surface of the layer to a second depth in the article.

In some embodiments, the method of making an antimicrobial article is configured such that the majority of the plurality of $Ag^+$ ions extending from the second surface of the layer to a second depth in the substrate is in a non-reduced state. The method can also be configured such that the second depth is at approximately 3 µm or less from the first surface of the article, and the first surface of the article has a concentration of $Ag^+$ ions in the range from about 1% by weight to about 50% by weight.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
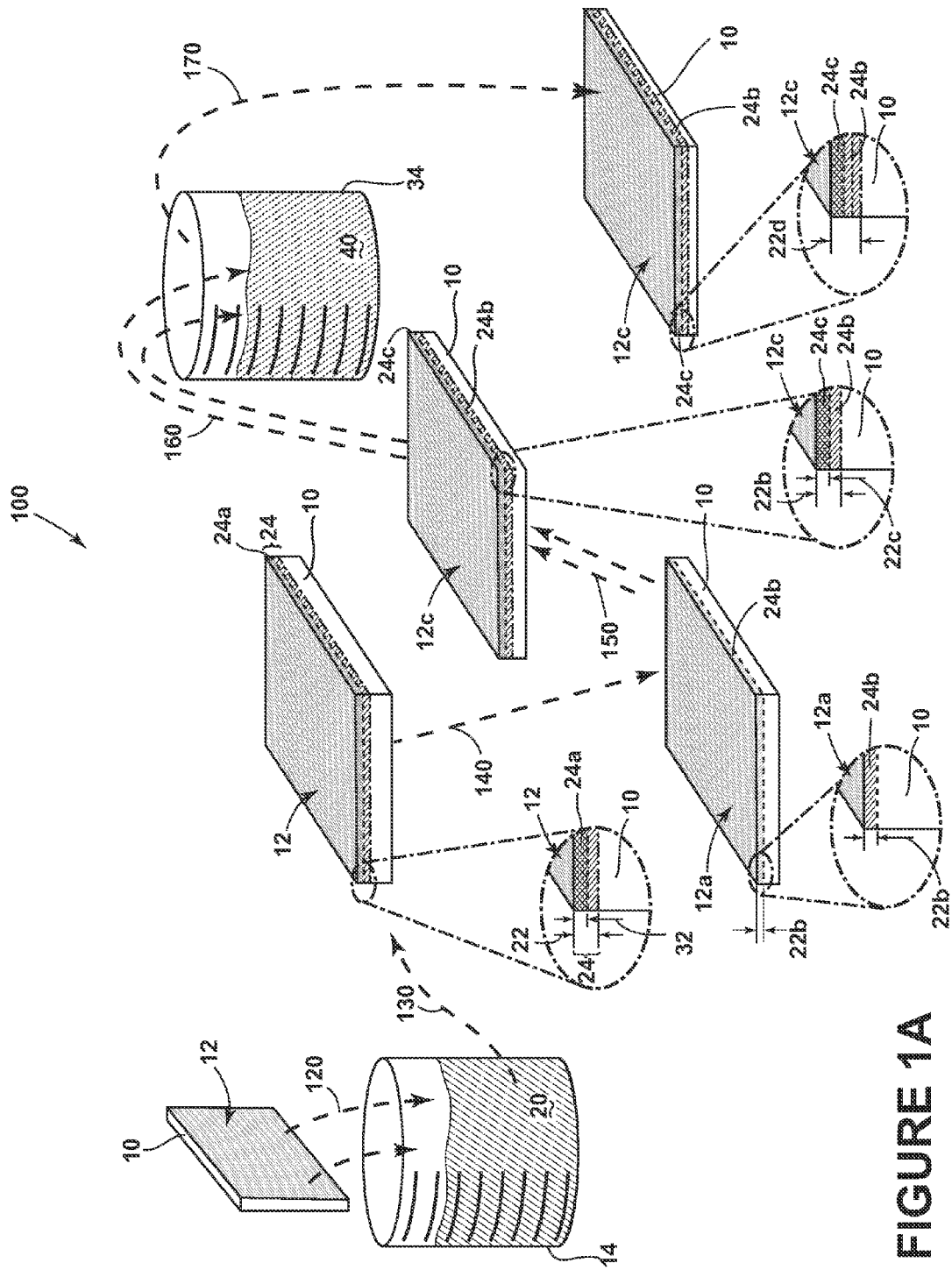
FIG. 1A is a schematic of a method of making an antimicrobial article according to one embodiment.

Reference will now be made in detail to various embodiments, examples of which are illustrated in the accompanying drawings. Whenever possible, the same reference numerals will be used throughout the drawings to refer to the same or like parts.

Ion-exchange processes can be used to impart both antimicrobial and strength-enhancing properties in transparent, semi-transparent and substantially opaque glass, glass-ceramic or ceramic articles by injecting certain metal ions. Antimicrobial properties, for example, can be developed by injecting $Ag^+$ ions into a surface region of the article. The $Ag^+$ ions in the surface region of the as-processed article interact with microbes at the surface of the article to kill them or otherwise inhibit their growth. However, the presence of these $Ag^+$ ions in the surface region of the article can alter the optical clarity and/or significantly increase the manufacturing costs of the article.

Downstream manufacturing processes associated with the articles, e.g., deposition of functional layers, can lead to a reduction reaction with these $Ag^+$ ions. The reaction products can cause discoloration and a reduction in the antimicrobial efficacy of the article. In addition, the thermal processing associated with these additional manufacturing processes can negatively impact the concentration profile of the $Ag^+$ ions at the surface of the article, another factor that can reduce antimicrobial efficacy.

Further, the processes used to inject the antimicrobial ions, e.g., $Ag^+$ ions, into the article can leave significant residue on the surface of the article. The residue on the surface of the article must be cleaned before additional manufacturing processes can be executed in connection with the article, including the deposition of a functional layer. The cleaning processes add manufacturing cost and potentially can affect the integrity of the surface of the article.

Accordingly, there is a need for new processes, and particular article configurations, for efficiently making strengthened, antimicrobial article products that maximize optical clarity and antimicrobial efficacy.

Discussed herein are new methods for making strengthened, antimicrobial articles and configurations for these articles. In particular, these methods, and article configurations, can be employed to efficiently treat or manufacture strengthened, antimicrobial article products that maximize optical clarity and antimicrobial efficacy. The methods generally involve the use of a dual-ion exchange process ("DIOX"). One ion exchange step is arranged to strengthen the article via exposure of the glass article to a first molten salt bath. The other step is configured to impart antimicrobial properties in the article via exposure of the article to a second molten salt bath.

In some embodiments, methods for making such articles are provided that seek to minimize the quantity of $Ag^+$ ion precursors used in the process without significant detriment to antimicrobial properties. In other embodiments, methods for making articles with antimicrobial properties and strength enhancements are provided that increase the lifetime of the bath containing the $Ag^+$ ion precursors.

Referring to FIG. 1A, a method of making an antimicrobial article 100 is provided. In the method 100 depicted in FIG. 1A, an article 10 is employed having a first surface 12 and a plurality of ion-exchangeable metal ions. As shown in FIG. 1A, the article 10 possesses other exterior surfaces in addition to first surface 12. In some embodiments, article 10 is primarily composed of a glass, glass-ceramic or ceramic composition.

In an exemplary embodiment, the article 10 is primarily composed of a silicate composition having ion-exchangeable metal ions. The metal ions are exchangeable in the sense that exposure of the article 10 and first surface 12 to a bath containing other metal ions can result in the exchange of some of the metal ions in the article 10 with metal ions from the bath. In one or more embodiments, a compressive stress is created by this ion exchange process in which a plurality of first metal ions in article 10, and specifically the first surface 12, are exchanged with a plurality of second metal ions (having an ionic radius larger than the plurality of first metal ions) so that a region of the article 10 comprises the plurality of the second metal ions. The presence of the larger second metal ions in this region creates the compressive stress in the region. The first metal ions may be alkali metal ions such as lithium, sodium, potassium, and rubidium. The second metal ions may be alkali metal ions such as sodium, potassium, rubidium, and cesium, with the proviso that the second alkali metal ion has an ionic radius greater than the ionic radius of the first alkali metal ion.

Article 10 can comprise various glass compositions. The choice of glass used for the glass article 10 is not limited to a particular composition, as antimicrobial properties can be obtained with enhanced strength using a variety of glass compositions. For example, the composition chosen can be any of a wide range of silicate, borosilicate, aluminosilicate or boroaluminosilicate glass compositions, which optionally can comprise one or more alkali and/or alkaline earth modifiers.

By way of illustration, one family of compositions that may be employed in glass article 10 includes those having at least one of aluminum oxide or boron oxide and at least one of an alkali metal oxide or an alkali earth metal oxide, wherein $-15$ mol $\% \leq (R_2O+R'O - Al_2O_3 - ZrO_2) - B_2O_3 \leq 4$ mol %, where R can be Li, Na, K, Rb, and/or Cs, and R' can be Mg, Ca, Sr, and/or Ba. One subset of this family of compositions includes from about 62 mol % to about 70 mol % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. Such glasses are described more fully in U.S. patent application Ser. No. 12/277,573, now U.S. Pat. No. 8,586,492 which issued on Nov. 19, 2013, hereby incorporated by reference in its entirety as if fully set forth below.

Another illustrative family of compositions that may be employed in article 10 includes those having at least 50 mol % $SiO_2$ and at least one modifier selected from the group consisting of alkali metal oxides and alkaline earth metal oxides, wherein $[(Al_2O_3 \text{ (mol \%)}+B_2O_3 \text{ (mol \%)})/(\Sigma \text{ alkali metal modifiers (mol \%)})]>1$. One subset of this family includes from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. Such glasses are described in more fully in U.S. patent application Ser. No. 12/858,490, hereby incorporated by reference in its entirety as if fully set forth below.

Yet another illustrative family of compositions that may be employed in article 10 includes those having $SiO_2$, $Al_2O_3$, $P_2O_5$, and at least one alkali metal oxide ($R_2O$), wherein $0.75 \leq [(P_2O_5 \text{ (mol \%)}+R_2O \text{(mol \%)})/M_2O_3 \text{ (mol \%)}] \leq 1.2$, where $M_2O_3=Al_2O_3+B_2O_3$. One subset of this family of compositions includes from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$. Another subset of this family of compositions includes from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. Such glasses are described more fully in U.S. patent application Ser. No. 13/305,271, hereby incorporated by reference in its entirety as if fully set forth below.

Yet another illustrative family of compositions that can be employed in article 10 includes those having at least about 4 mol % $P_2O_5$, wherein $(M_2O_3 \text{ (mol \%)}/R_xO \text{ (mol \%)}) \leq 1$, wherein $M_2O_3=Al_2O_3+B_2O_3$, and wherein $R_xO$ is the sum of monovalent and divalent cation oxides present in the glass. The monovalent and divalent cation oxides can be selected from the group consisting of $Li_2O$, $Na_2O$, $K_2O$, $Rb_2O$, $Cs_2O$, MgO, CaO, SrO, BaO, and ZnO. One subset of this family of compositions includes glasses having 0 mol % $B_2O_3$. Such glasses are more fully described in U.S. Provisional Patent Application No. 61/560,434, the content of which is hereby incorporated by reference in its entirety as if fully set forth below.

Still another illustrative family of compositions that can be employed in article 10 includes those having $Al_2O_3$, $B_2O_3$, alkali metal oxides, and contains boron cations having threefold coordination. When ion exchanged, these glasses can have a Vickers crack initiation threshold of at least about 30 kilograms force (kgf). One subset of this family of compositions includes at least about 50 mol % $SiO_2$; at least about 10 mol % $R_2O$, wherein $R_2O$ comprises $Na_2O$; $Al_2O_3$, wherein $-0.5$ mol % $\leq Al_2O_3$ (mol %) $-R_2O$ (mol %) $\leq 2$ mol %; and $B_2O_3$, and wherein $B_2O_3$ (mol %)$-(R_2O$ (mol %)$-Al_2O_3$ (mol %))$\geq 4.5$ mol %. Another subset of this family of compositions includes at least about 50 mol % $SiO_2$, from about 9 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein $0 \leq MgO+ZnO \leq 6$ mol %; and, optionally, at least one of CaO, BaO, and SrO, wherein 0 mol % $\leq CaO+SrO+BaO \leq 2$ mol %. Such glasses are more fully described in U.S. Provisional Patent Application No. 61/653,485, the content of which is incorporated herein by reference in its entirety as if fully set forth below.

Article 10 may also comprise a glass-ceramic or ceramic composition. With respect to ceramics, the material chosen for article 10 can be any of a wide range of inorganic crystalline oxides, nitrides, carbides, oxynitrides, carbonitrides, and/or the like. Illustrative ceramics include those materials having an alumina, aluminum titanate, mullite, cordierite, zircon, spinel, persovskite, zirconia, ceria, silicon carbide, silicon nitride, silicon aluminum oxynitride or zeolite phase.

Similarly, with respect to glass-ceramics, the material chosen for article 10 can be any of a wide range of materials having both a glassy phase and a ceramic phase. Illustrative glass-ceramics include those materials where the glass phase is formed from a silicate, borosilicate, aluminosilicate, or boroaluminosilicate, and the ceramic phase is formed from β-spodumene, β-quartz, nepheline, kalsilite, or carnegieite.

The article 10 can adopt a variety of physical forms, including a substrate. That is, from a cross-sectional perspective, the article 10, when configured as a substrate, can be flat or planar, or it can be curved and/or sharply-bent. Similarly, the article 10 can be a single unitary object, a multi-layered structure or a laminate. As shown in FIG. 1A, for example, the article 10 is configured into a substrate or substrate-like form.

Referring again to FIG. 1A, the method of making an antimicrobial article 100 employs a strengthening bath 20 contained within a vessel 14. The strengthening bath 20 contains a plurality of ion-exchanging metal ions. In some embodiments, for example, bath 20 may contain a plurality of potassium ions that are larger in size than ion-exchangeable ions, such as sodium, contained in the article 10. These ion-exchanging ions contained in the bath 20 will preferentially exchange with ion-exchangeable ions in the article 10 when the article 10 is submersed in the bath 20. In other embodiments, the strengthening bath 20 comprises a molten $KNO_3$ bath at a concentration approaching 100% with additives or at a concentration of 100%, sufficiently heated to a temperature to ensure that the $KNO_3$ remains in a molten state during processing of the article 10. The strengthening bath 20 may also include the combination of $KNO_3$ and one or both of $NaNO_3$ and $LiNO_3$.

Still referring to FIG. 1A, the method of making an antimicrobial article 100 depicted in FIG. 1A includes a step 120 for submersing the article 10 into the strengthening bath 20. Upon submersion into the bath 20, a portion of the plurality of the ion-exchangeable ions (e.g., $Na^+$ ions) in the article 10 are exchanged with a portion of the plurality of the ion-exchanging ions (e.g., $K^+$ ions) contained in the strengthening bath 20. According to some embodiments, the submersion step 120 is conducted for a predetermined time based on the composition of the bath 20, temperature of the bath 20, composition of the article 10 and/or the desired concentration of the ion-exchanging ions in the article 10.

After the submersion step 120 is completed, a washing step 130 is conducted to remove material from the bath 20 that remains on the surfaces of article 10, including the first surface 12. Deionized water, for example, can be used in the washing step 130 to remove material from the bath 20 on the surfaces of the article 10. Other media may also be employed for washing the surfaces of the article 10, provided that the media are selected to avoid any reactions with material from the bath 20 and/or the particular composition of the article 10.

As the ion-exchanging ions from the bath 20 are distributed into the article 10 at the expense of the ion-exchangeable ions originally in the article 10, a compressive stress layer 24 develops in the article 10. The compressive stress layer 24 extends from the first surface 12 to a first depth 22 in the glass article 10. In general, an appreciable concentration of the ion-exchanging ions from the strengthening bath 20 (e.g., $K^+$ ions) exists in the compressive stress layer 24 after the submersion and washing steps 120 and 130, respectively. These ion-exchanging ions are generally larger than the ion-exchangeable ions (e.g., $Na^+$ ions), thereby increasing the compressive stress level in the layer 24 within the article 10. In addition, the amount of compressive stress ("CS") associated with the compressive stress layer 24 and the first depth 22 can each be varied (by virtue of the conditions of the submersion step 120, for example) based on the intended use of the article 10.

In some embodiments, the CS level in the compressive stress layer 24 and the first depth 22 are controlled such that tensile stresses generated within the article 10 as a result of the compressive stress layer 24 do not become excessive to the point of rendering the article 10 frangible, particularly for an article 10 that is primarily composed of a glass composition. According to some embodiments, the CS level in the layer 24 may be about 200 MPa or greater. For example, the CS level in the layer 24 may be up to about 700 MPa, up to about 800 MPa, up to about 900 MPa, or even up to about 1000 MPa. The first depth 22 of the ion-exchanging ions and thus the layer 24 is often referred to as the depth of layer ("DOL") and may be about 15 μm or greater. In some instances, the DOL may be in the range from about 15 μm to about 50 μm, from about 20 μm to about 45 μm, or from about 30 μm to about 40 μm.

Referring again to FIG. 1A, the method of making an antimicrobial article 100 further can include a step 140, in some embodiments, for removing a portion 24a of the compressive stress layer 24 from the first surface 12 of the article 10 to a removal depth 32 above the first depth 22 to define a new first surface 12a. That is, the removing step 140 removes material from the compressive stress layer 24 down to a removal depth 32 such that a new surface 12a is formed in the article 10. Further, the removing step 140 that removes the portion 24a from the compressive stress layer 24 effectively creates a remaining compressive stress layer 24b in the article 10 that is defined by the new surface 12a and the first depth 22. As shown in FIG. 1A, the remaining compressive stress layer 24b is defined by a thickness 22b.

In some embodiments of method 100, the removing step 140 is controlled such that material is removed from the article 10 to the removal depth 32 at about 0.5 μm to about 2 μm from the first surface 12. In other embodiments of method 100, the removing step 140 is controlled such that material is removed from the article 10 to the removal depth 32 at about 0.1 μm to about 2 μm from the first surface 12. The removing step 140 may also be controlled such that material is removed from the article 10 to the removal depth 32 at about 0.2 μm, 0.3 μm, 0.4 μm, 0.5 μm, 0.6 μm, 0.7 μm, 0.8 μm, 0.9 μm, 1 μm, 1.1 μm, 1.2 μm, 1.3 μm, 1.4 μm, 1.5 μm, 1.6 μm, 1.7 μm, 1.8 μm, 1.9 μm or 2 μm.

Various processes can be employed in the removing step 140 including, but not limited to, touch polishing, acid etching and other types of material removal processes. Other material removal processes may be employed as understood by those with ordinary skill in the art, provided that they are adapted to remove surface and bulk flaws in the surface of the article 10. In some embodiments, particularly those associated with an article 10 primarily composed of a transparent material, these material removal steps should be adapted to remove surface and bulk flaws in the surface of article 10 without impacting optical clarity.

In some embodiments, the removing step 140 removes surface and bulk flaws preexisting within the compressive stress layer 24 from the manufacture of the article 10 and/or surface and bulk flaws created in the article 10 during the submersion step 120. In other embodiments, the removing step 140 can also remove and/or mitigate hydrogen that has diffused into the compressive stress layer 24 during the submersion step 120. Accordingly, the removing step 140 plays a role in enhancing the overall strength of the article 10, above and beyond strength enhancements obtained from the submersion step 120.

Referring again to FIG. 1A, the method of making an antimicrobial article 100 further includes a step 150 for forming a layer 24c on the first surface 12a, or for forming a layer 24c on first surface 12 (if the removing step 140 is not conducted). The layer 24c is arranged over the remaining compressive stress layer 24b, or over the compressive stress layer 24 if the removing step 140 is not conducted (see, e.g., FIG. 1B and corresponding description). The layer 24c, as deposited on the article 10, defines a new first surface 12c and thickness 22c as shown in FIG. 1A. The layer 24c can be a functional layer. For example, the layer 24c can include a fingerprint-resistant coating, a smudge-resistant coating or an easy-to-clean coating. In some embodiments, the layer 24c is a hydrophobic coating. Further, the thickness 22c of the layer 24c can be about 5 nm to 30 nm. In some embodiments, the thickness 22c of the layer 24c can range from up to about 30 nm, 25 nm, 20 nm, 15 nm, 10 nm, 5 nm, 4 nm, 3 nm, 2 nm or 1 nm.

According to some additional variants, the layer 24c may further include a primer layer, disposed directly on the first surface 12a or first surface 12. The primer layer is typically formed on the first surface 12a, 12 before development of the layer 24c. For instance, a $SiO_2$ primer layer can be deposited on the first surface 12a or first surface 12 using known processes (e.g., physical vapor deposition ("PVD"), chemical vapor deposition ("CVD") and others) to a thickness of about 5 nm to 30 nm. In some embodiments, the primer layer ranges from up to about 30 nm, 25 nm, 20 nm, 15 nm, 10 nm, 5 nm, 4 nm, 3 nm, 2 nm or 1 nm. As such, the total range of the thickness 22c of the layer 24c and the primer layer (when present) can be from about 1 nm to 60 nm.

Various processes can be employed to deposit the layer 24c on the article 10, depending upon its composition and function, as understood by those in the art. In general, the layer 24c can be fabricated independently using any of the variants of CVD (e.g., plasma-enhanced CVD, aerosol-assisted CVD, metal organic CVD, and the like), any of the variants of PVD (e.g., ion-assisted PVD, pulsed laser deposition, cathodic arc deposition, sputtering, and the like), spray coating, spin-coating, dip-coating, inkjetting, sol-gel processing, or the like. In many implementations, the materials used to form layer 24c may need to undergo an additional treatment step to finalize its layer (or layers). These treatments may involve multiple deposition, curing and/or heat treatment steps depending on the composition and structure selected for layer 24c. Such processes and treatments are known to those skilled in the art to which this disclosure pertains. For example, layer 24c can be an anti-fingerprint coating derived from a Dow Corning® 2634 Coating (i.e., an alkoxysilane in a fluorinated solvent). The anti-fingerprint coating is prepared in step 150 by dip coating an article 10 with the Dow Corning® 2634 Coating constituents, and then the coated article 10 can be dried and/or cured at ambient or elevated temperatures.

Referring again to FIG. 1A, the method of making an antimicrobial article 100 additionally employs an antimicrobial bath 40 contained in a vessel 34 that comprises a plurality of metal ions that can provide an antimicrobial effect. In some embodiments, the antimicrobial bath 40 includes a plurality of silver ions, each of which can provide an antimicrobial effect; a plurality of ion-exchangeable metal ions consistent with those present in the as-produced article 10; and a plurality of ion-exchanging ions consistent with those present in the strengthening bath 20. According to an exemplary embodiment, the bath 40 can possess a plurality of silver ions derived from molten $AgNO_3$ at a bath concentration of about 5% to 100% by weight. According to another exemplary embodiment, the bath 40 possesses a plurality of silver ions derived from molten $AgNO_3$ at a bath concentration of about 5% to about 50% by weight. In a further embodiment, the antimicrobial bath 40 comprises about 5% to about 50% by weight molten $AgNO_3$ with a balance of molten $KNO_3$ and $NaNO_3$. In an additional embodiment, the bath 40 possesses about 5% to up to 100% by weight molten $AgNO_3$ with a balance of molten $KNO_3$ and $NaNO_3$. The antimicrobial bath 40 can comprise a molten mixture of 50% $AgNO_3$ and 50% $KNO_3+NaNO_3$ by weight.

According to some embodiments, the antimicrobial bath 40 can be set at a temperature ranging from about 150° C. to about 400° C. When antimicrobial bath 40 comprises molten $AgNO_3$ at a bath concentration of about 5% to about 50% by weight, bath 40 may be set at a temperature ranging from about 200° C. to about 375° C. In some embodiments of the method for making an antimicrobial article 100, the antimicrobial bath 40 is set at a temperature ranging from about 150° C. to about 275° C. and comprises 5% to up to 100% by weight molten $AgNO_3$ with a balance of molten $KNO_3$ and $NaNO_3$ (which may be in equal concentrations). The antimicrobial bath 40 can also be set at a temperature ranging from about 300° C. to about 375° C. and comprises 5% to about 50% by weight molten $AgNO_3$ with a balance of molten $KNO_3$ and $NaNO_3$ (which may be in equal concentrations) in some embodiments. Further, the antimicrobial bath 40 is generally limited to a temperature with a margin below a temperature that could damage the properties of the layer 24c. As such, the temperature of the antimicrobial bath 40 can be set in part based on the composition and structure of the layer 24c.

Figure 1B:
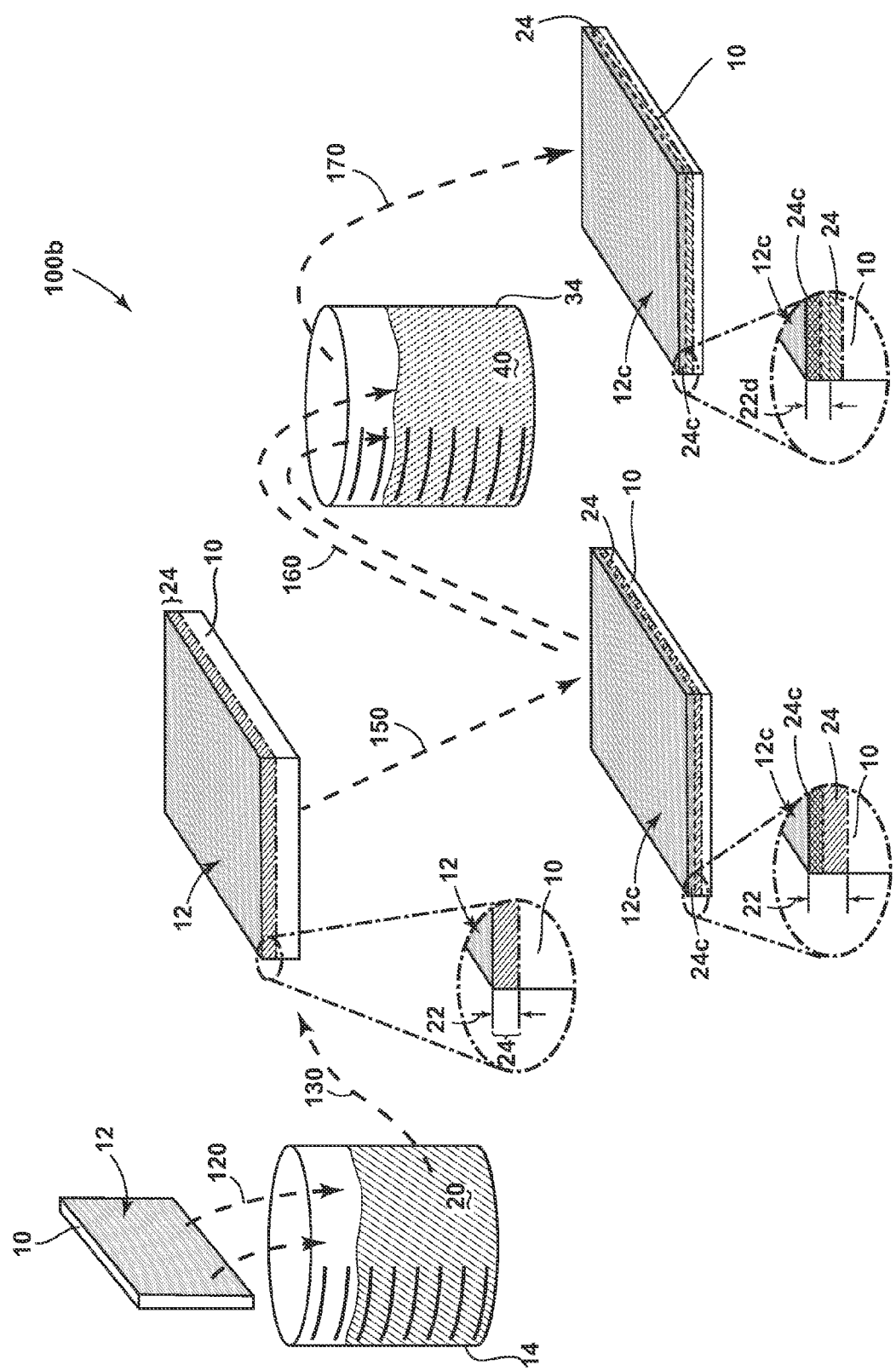
FIG. 1B is a schematic of a method of making an antimicrobial article according to another embodiment.

Referring further to FIG. 1A, the method of making an antimicrobial article 100 includes a step 160 for submersing the article 10 in the antimicrobial bath 40 to exchange a portion of the ion-exchangeable (e.g., $Na^+$ ions) and the ion-exchanging metal ions (e.g., $K^+$ ions) in the remaining compressive stress layer 24b, or compressive stress layer 24 (if method 100b is conducted without removing step 140 as shown in FIG. 1B, and outlined in the corresponding description) with a portion of the plurality of silver metal ions in the antimicrobial bath 40 to impart an antimicrobial property in the article 10. The presence of the $KNO_3$ and/or $NaNO_3$ constituents in the bath 40 helps prevent a significant quantity of strength-enhancing $K^+$ ions from being removed from the remaining compressive stress layer 24b (or compressive stress layer 24) in the article 10 during the submersion step 160.

The antimicrobial property generated in step 160 exists in an antimicrobial region in the article 10 from the new first surface 12c of the layer 24c to an antimicrobial depth 22d within the article 10. In some embodiments, the antimicrobial depth 22d is set above the first depth 22, i.e., the depth of the compressive stress region 24b (see FIG. 1A) or compressive stress region 24 (see FIG. 1B). Hence, in these embodiments, the antimicrobial region (i.e., the region that spans the article 10 to the antimicrobial depth 22d) does not extend as deep as the compressive stress region 24b (see FIG. 1A) or the compressive stress region 24 (see FIG. 1B; e.g., from the first surface 12 to the first depth 22). According to some embodiments, the antimicrobial region in the article 10 developed during submersion step 160 is defined such that a plurality of $Ag^+$ ions in a non-reduced state extends from the new first surface 12c of the layer 24c to the antimicrobial depth 22d.

The antimicrobial depth 22d can be set such that it includes layer 24c and further extends into the article 10 to approximately 1 µm or less from the first surface 12a (FIG. 1A) or first surface 12 (FIG. 1) of the article 10. In some embodiments, the antimicrobial depth 22d is set to extend into the article 10 to approximately 1.5 µm or less, 1.4 µm or less, 1.3 µm or less, 1.2 µm or less, 1.1 µm or less, 1.0 µm or less, 0.9 µm or less, 0.8 µm or less, 0.7 µm or less, 0.6 µm or less, 0.5 µm or less, 0.4 µm or less, 0.3 µm or less, 0.2 µm or less, or 0.1 µm or less from the first surface 12a or first surface 12.

It should also be understood that some of the antimicrobial ions (e.g., $Ag^+$ metal ions) imparted in step 160 can remain in the layer 24c according to some embodiments. As such, the antimicrobial region is defined from the first surface 12c, through the layer 24c and through the article 10 down to the antimicrobial depth 22d for these embodiments. Further, step 160 is conducted in bath 40 such that the antimicrobial ions are introduced through the layer 24c to interact with the underlying article 10. As such, the composition of layer 24c should be selected to ensure that the selected antimicrobial ions in bath 40 can diffuse through the layer 24c during the performance of step 160.

According to some embodiments of the method 100, step 160 is conducted to incorporate antimicrobial ions into the article 10 with no appreciable quantity of antimicrobial ions remaining in the layer 24c. For these embodiments, the antimicrobial region is defined from the first surface 12a of the article 10 down to an antimicrobial depth 22d. According to some embodiments, the antimicrobial region in the article 10 developed during submersion step 160 is defined such that a plurality of $Ag^+$ ions in a non-reduced state extends from the first surface 12a down to the antimicrobial depth 22d in the article 10. Step 160, however, is conducted in bath 40 such that the antimicrobial ions are introduced through the layer 24c to interact with the underlying article 10. As such, the composition of layer 24c should be selected for these embodiments to ensure that the selected antimicrobial ions in bath 40 can diffuse through the layer 24c during the performance of step 160 and develop an antimicrobial region in the article 10 beneath the layer 24c.

In some embodiments of the method of making antimicrobial article 100, the step 160 for submersing the article 10 in the antimicrobial bath 40 incorporates a substantial quantity of antimicrobial ions (e.g., $Ag^+$ metal ions) into the layer 24c and no appreciable quantity of antimicrobial ions into the article 10 (e.g., a substrate) beneath the layer 24c. For these embodiments, the antimicrobial ions define an antimicrobial region that spans from the first surface 12c to an antimicrobial depth 22d, all within the layer 24c. In addition, the antimicrobial region in the article 10 developed during submersion step 160 can be defined such that a plurality of $Ag^+$ ions in a non-reduced state extends from the new first surface 12c to the antimicrobial depth 22d, all within the layer 24c. According to these embodiments with antimicrobial ions generally relegated to the layer 24c, the antimicrobial ions from the bath 40 can be injected or otherwise incorporated into the layer 24c through diffusion, absorption and/or adsorption depending upon the diffusivity, permeability and other properties of the layer 24c, the composition of the bath 40 and the composition of the article 10 beneath the layer 24c. In addition, these embodiments can employ a layer 24c particularly configured to facilitate incorporation of antimicrobial ions during the step 160 and retention of these antimicrobial ions such that the layer 24c retains an antimicrobial property through the lifetime of the article 10, as employed in an end-use application (e.g., a touch screen configured with a mobile telecommunication device).

In some embodiments of method 100, the step 160 for submersing the article 10 in the antimicrobial bath 40 is controlled for a time, temperature and/or bath concentration sufficient to impart antimicrobial property-imparting ions (e.g., $Ag^+$ ions) into the article 10 and/or the layer 24c for development and retention of the desired antimicrobial properties. According to some embodiments, $Ag^+$ ions are imparted through the layer 24c into the new first surface 12a of the article 10 at a concentration of about 5% to about 70% by weight (by weight % of $Ag_2O$, at the first surface 12a) in step 160, and about 1% to about 50% by weight in other embodiments. In some embodiments, the $Ag^+$ ions are imparted through the layer 24c into the new first surface 12a of the article 10 at a concentration of about 1% to about 40% by weight (at the first surface 12a). In further embodiments, $Ag^+$ ions are imparted into the new first surface 12a of the glass article 10 at a concentration of about 5%, 10%, 15%, 20%, 25%, 30%, 35% or 40%. In addition, the duration of the submersion step 160 may also be set based on the composition of the layer 24c and temperature of the antimicrobial bath 40 to ensure that the exposure of the layer 24c to the antimicrobial bath 40 does not damage it.

In some embodiments of method 100, step 160 is conducted for a time, temperature and/or bath concentration such that $Ag^+$ ions are imparted into the layer 24c and/or the article 10 underneath the layer 24c to an antimicrobial depth 22d, defined within the layer 24c or the article 10. For these embodiments, $Ag^+$ ions are imparted into the layer 24c and/or the article 10 at a concentration of about 5% to about 70% by weight (by weight % of $Ag_2O$, at the antimicrobial depth 22d) in step 160, and about 1% to about 50% by weight in other embodiments. In some embodiments, the $Ag^+$ ions are imparted into the layer 24c and/or the article 10 at a concentration of about 1% to about 40% by weight (at the antimicrobial depth 22d). In further embodiments, $Ag^+$ ions are imparted into the new first surface 12a of the glass article 10 at a concentration of about 5%, 10%, 15%, 20%, 25%, 30%, 35% or 40% (at the antimicrobial depth 22d).

The duration of the step 160 is controlled based on the composition and temperature of bath 40, the composition of the article 10, composition of layer 24c and the desired antimicrobial properties to develop in the antimicrobial region. In some embodiments, the duration of step 160 is controlled from about 15 minutes (e.g., about 20 minutes or greater, about 25 minutes or greater, about 30 minutes or greater or about 35 minutes or greater) to about 10 hours. In other embodiments, the duration of step 160 is from about 15 minutes to about 60 minutes. In some additional embodiments of the method 100, step 160 is controlled to a duration of about 25 minutes to about 35 minutes.

After the submersion step 160 is completed, a washing step 170 is conducted to remove material from the bath 40 remaining on the surfaces of article 10, particularly the first surface 12c of the layer 24c. Deionized water, for example, can be used in the washing step 170 to remove material from the bath 40 on the surfaces of the article 10, particularly the first surface 12c of the layer 24c. Other media may also be employed for washing the surfaces of the article 10, provided that the media is selected to avoid any reactions with material from the bath 40, the composition of the article 10 and/or the layer 24c.

Referring to FIG. 1B, an embodiment of the method of making an antimicrobial article 100b is depicted that does not include a material removal step (e.g., material removal step 140, as shown in FIG. 1A). Essentially, the method 100b depicted in FIG. 1B proceeds exactly as the method 100 in FIG. 1A, but without a material removal step. As a result, the article 10 produced according to the method 100b depicted in FIG. 1B possesses a layer 24c over the compressive stress region 24 (i.e., there is no remaining compressive stress region 24b as depicted in FIG. 1A).

The methods of making an antimicrobial article 100, 100b, as depicted in FIGS. 1A and 1B, respectively, can be advantageous in the sense that the step 160 for incorporating antimicrobial ions (e.g., $Ag^+$ ions) is conducted after the step 150 for forming a layer (e.g., an easy-to-clean hydrophobic, functional layer). One advantage associated with the methods 100, 100b is the development of an antimicrobial region in the article 10 that does not lead to reduced optical clarity (e.g., for articles 10 comprising a substantially transparent glass composition) and/or coloration changes (e.g., for articles 10 comprising an opaque or otherwise colored glass-ceramic or ceramic composition). By incorporating the antimicrobial ions into the article 10 after the processes and heat treatments associated with the layer 24c are performed, the methods 100, 100b reduce or eliminate the risk of reduction reactions with the antimicrobial ions and/or diffusion that can cause discoloration, coloration changes and/or loss in antimicrobial efficacy.

Another performance-related advantage relates to mechanical integrity of the article 10. When the antimicrobial submersion step 160 is performed after the step 150 for forming the layer 24c according to methods 100, 100b, aggressive cleaning steps of the surface of article 10 (e.g., washing and cleaning steps to remove antimicrobial ions and salts) are not required before deposition of the layer 24c. These aggressive cleaning steps might otherwise introduce flaws and other defects into the surface of the article 10. As such, the elimination of these aggressive cleaning steps reduces the likelihood that flaws and other defects are introduced into the surface of the article that could otherwise negatively impact the mechanical properties of the article 10 (e.g., Weibull modulus, Weibull characteristic strength, average strength, etc.).

Methods 100 and 100b depicted in FIGS. 1A and 1B, respectively, also provide manufacturing and cost savings advantages. It is significantly less costly to prepare the surface of article 10 for the formation of layer 24c when the step for development of the antimicrobial region is conducted after the formation of layer 24c. That is, residual antimicrobial ions and salts, which could negatively impact the integrity of layer 24c, are not present on the surface of article 10 when the submersion step 160 is performed after step 150 for forming the layer 24c according to methods 100 and 100b. In addition, it is significantly easier and less costly to clean residual antimicrobial ions from the surface of the layer 24c compared to the surface of the article 10. This is because many embodiments of the method 100 and 100b are configured to develop a layer 24c with surface energies less conducive to wetting of the antimicrobial ion salts (e.g., easy-to-clean hydrophobic surfaces). There are also cost savings associated with less retention of residual antimicrobial ions on the surface of layer 24c after the submersion step 160. Because lower quantities of expensive antimicrobial ions (e.g., $Ag^+$ ions) remain on the surface of layer 24c after performance of step 160, the loss of the antimicrobial ions during the subsequent washing step 170 is minimized.

According to the methods 100, 100b, the antimicrobial activity and efficacy obtained in the article 10 and/or in the layer 24c via step 160 can be quite high. For example, articles 10 fabricated according to the methods 100, 100b described herein can exhibit at least a two log reduction (i.e., LR>~2 or kill rate of 99%) of at least *Staphylococcus aureus, Enterobacter aerogenes*, and *Pseudomonas aeruginosa* bacteria when tested according to the "dry" protocol described in U.S. Provisional Patent Application No. 61/908,401, which is hereby incorporated by reference in its entirety as if fully set forth below. In some embodiments, the antimicrobial articles are tested at about 23° C. in about 42% humidity, and the articles are expected to demonstrate at least a two log reduction (i.e., LR>~2 or kill rate of 99%) of at least *Staphylococcus aureus, Enterobacter aerogenes*, and *Pseudomonas aeruginosa* bacteria when tested according to the "dry" protocol under these conditions. In some embodiments, it is expected that articles 10 fabricated according to the methods 100, 100b described herein can exhibit at least a three log reduction on average (i.e., LR>~3 or kill rate of 99.9%) of at least *Staphylococcus aureus, Enterobacter aerogenes*, and *Pseudomonas aeruginosa* bacteria when tested according to the "dry" protocol. Further, a "dry" protocol for demonstrating the antimicrobial efficacy of articles 10 fabricated with methods 100, 100b can include the steps: (a) inoculating nutrient agar with a portion of a stock having a plurality of bacterial organisms to form a culture; (b) incubating the culture to form a first incubated culture, incubating a portion of the first incubated culture with nutrient agar to form a second incubated culture, incubating a portion of the second incubated culture with nutrient agar to form a third incubated culture, and incubating the third incubated culture for approximately 48 hours to form an inoculated test plate with a plurality of bacterial colonies; (c) forming an inoculum by suspending a portion of the plurality of bacterial colonies in a buffered test solution, adjusting the test solution to a pH of approximately 7 to 8, and adding an organic soil serum at a concentration of approximately 10% to 30% by weight to the test solution; (d) inoculating the antimicrobial region of the antimicrobial article with a portion of the inoculum; (e) incubating the inoculated antimicrobial article for at least approximately two hours; and (f) washing the incubated and inoculated antimicrobial article in a neutralizing solution to form a residual test inoculum, counting the number of surviving bacterial colonies per volume in the residual test inoculum, and calculating the percent reduction in the number of surviving bacterial colonies in the residual test inoculum relative to a residual control inoculum.

The antimicrobial activity and efficacy of antimicrobial articles 10, and such articles fabricated with methods 100, 100b, can also be demonstrated with an "ambient" protocol, based largely on Japanese Industrial Standard JIS Z 2801 (2000), entitled "Antimicrobial Products—Test for Antimicrobial Activity and Efficacy," the content of which is hereby incorporated by reference in its entirety as if fully set forth below. For example, the articles 10 can be tested at about 23° C. and about 42% humidity for about 24 hours. Specifically, five (5) control samples and five (5) test samples can be used, wherein each sample has a specific inoculum composition and volume applied thereto, with a sterile coverslip applied to the inoculated samples to ensure uniform spreading on a known surface area. The covered samples can be incubated under the conditions described above, dried for about 6 hours to about 24 hours, rinsed with a buffer solution, and enumerated by culturing on an agar plate, the last two steps of which are similar to the procedure employed in the JIS Z 2801 (2000) test. Using this test, it is believed that the antimicrobial articles 10, fabricated according to the methods 100, 100b, described herein can exhibit at least a one log reduction (i.e., LR>~1 or a kill rate of 90%) of at least *Staphylococcus aureus* bacteria and at least a two log reduction (i.e., LR>~2 or a kill rate of 99.99%) of at least *Enterobacter aerogenes*, and *Pseudomonas aeruginosa* bacteria. In other implementations, it is believed that the antimicrobial articles 10 described herein can exhibit at least a three log reduction (i.e., LR>~3 or a kill rate of 99.9%) of any bacteria to which they are exposed to under these testing conditions.

The antimicrobial activity and efficacy can also be measured in accordance with JIS Z 2801 (2000). Under the "wet" conditions of this test (i.e., about 37° C. and greater than 90% humidity for about 24 hours), it is believed that the antimicrobial glass articles fabricated according to the methods described herein (e.g., methods 100, 100b) can exhibit at least a five log reduction (i.e., LR>~5 or a kill rate of 99.999%) of at least *Staphylococcus aureus, Enterobacter aerogenes*, and *Pseudomonas aeruginosa* bacteria.

Figure 2A:
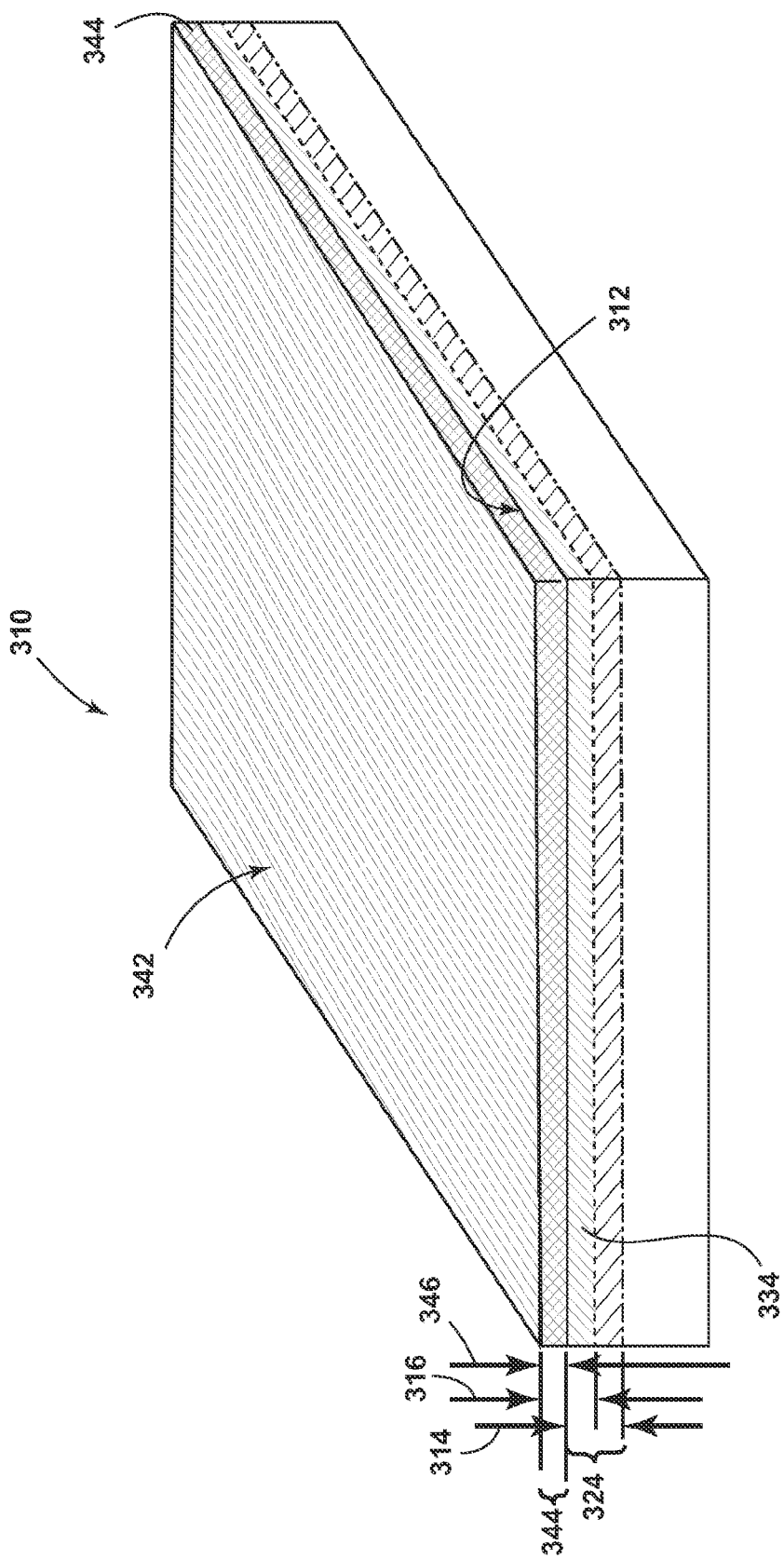
FIG. 2A is a schematic of an antimicrobial article according to a further embodiment.

As depicted in FIG. 2A, an antimicrobial article 310 is provided according to a further embodiment. In some embodiments, article 310 is primarily composed of a glass, glass-ceramic or ceramic composition and/or shape factors comparable to those employed in article 10 (see FIGS. 1A and 1B, and the corresponding description). The article 310 includes a first surface 312. In some embodiments, first surface 312 is configured to be substantially free of strength-reducing defects (e.g., as the result of a material removal step 140 employed in method 100 depicted in FIG. 1A). According to some embodiments, the first surface 312 is substantially free of hydrogen as measured by Secondary Ion Mass Spectrometry ("SIMS"). In other embodiments, a surface region of the article 310 between the first surface 312 and about 0.5 µm in depth is substantially free of hydrogen penetration. As used herein, the phrase "substantially free of hydrogen penetration" includes a hydrogen penetration as measured by SIMS techniques of about 1000 counts/second or less. In more specific embodiments, a surface region between about 0.1 µm to about 0.5 µm in depth from the first surface 312 is substantially free of hydrogen penetration.

The article 310 depicted in FIG. 2A also includes a compressive stress layer 324 that extends from the first surface 312 of the article 310 to a first selected depth 314. The article 310 also includes a layer 344 disposed on the first surface 312 of the article 310. The layer 344 defines a second surface 342 of the article 310 and possesses a thickness 346. Further, layer 344 is comparable to layer 24c (see FIGS. 1A and 1B); hence, layer 344 can be a functional layer. For example, the layer 344 can include a fingerprint-resistant coating, a smudge-resistant coating, an easy-to-clean coating, a color-providing composition, an environmental barrier coating, or an electrically conductive coating. In some embodiments, the layer 344 is a hydrophobic coating. Further, layer 344 can be formed or otherwise deposited on the first surface 312 of the article 310 by various processes comparable to those employed to form layer 24c.

Referring again to FIG. 2A, the article 310 also comprises an antimicrobial region 334 comprising a plurality of antimicrobial ions (e.g., $Ag^+$ ions) extending from the first surface 312 to an antimicrobial depth 316. In some embodiments, the antimicrobial region 334 extends from the second surface 342 of the layer 344, through the layer 344, and down to the antimicrobial depth 316. The first surface 312 of the article 310 can have a concentration of antimicrobial ions (e.g., $Ag^+$ ions) that ranges from about 5% to about 70% by weight. In other embodiments, the first surface 312 has a concentration of antimicrobial ions that ranges from about 1% to about 50% by weight. According to an exemplary embodiment, the concentration of $Ag^+$ ions at the first surface 312 is from about 1% to about 40% by weight.

In some exemplary embodiments, the antimicrobial depth 316 is set at approximately 3 μm or less, about 2 μm or less, or about 1 μm or less from the first surface 312 in the article 310. In an additional embodiment, the antimicrobial depth 316 is set at approximately 0.1 μm to approximately 3 μm. It should also be understood that, in some embodiments, one or more $Ag^+$ ions may be present in the article 310 to a depth below the antimicrobial depth 316 (outside of the antimicrobial region 334) at antimicrobial levels that are not readily measurable and/or a substantial contributor to the antimicrobial efficacy of the article 310. Any such, $Ag^+$ ions existing in the article 310 deeper than the antimicrobial depth 316, and extending to a residual antimicrobial depth, define a residual antimicrobial region that, in some embodiments, may provide a contribution to the antimicrobial efficacy of the article 310. Conceivably, the residual antimicrobial depth could extend through the full thickness of the article 310.

Figure 2B:
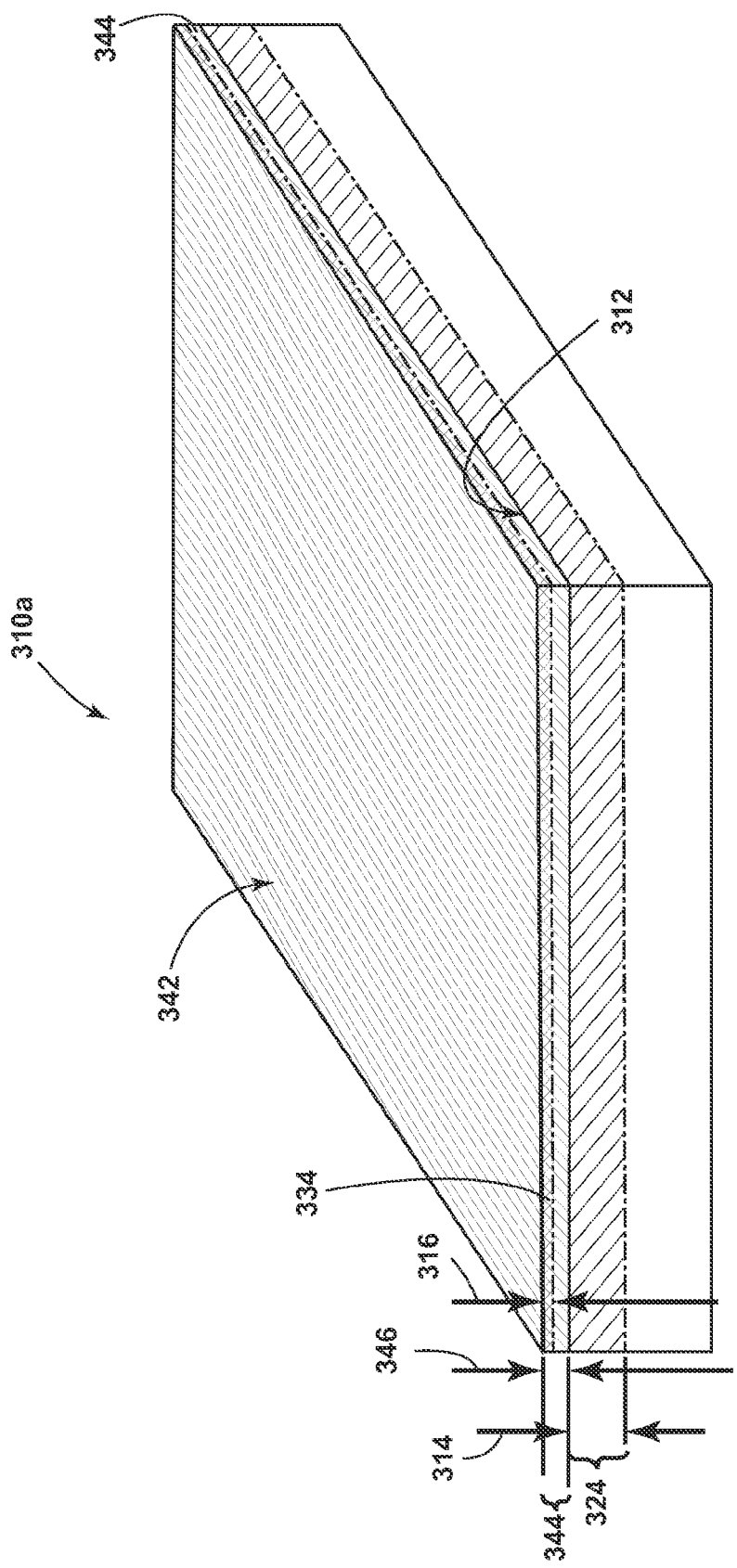
FIG. 2B is a schematic of an antimicrobial article according to an embodiment.

As depicted in FIG. 2B, an antimicrobial article 310a is provided according to an embodiment. Antimicrobial article 310a shown in FIG. 2B is largely similar to the article 310 depicted in FIG. 2A, and like-numbered elements are configured and/or processed identically unless otherwise noted as follows. In the antimicrobial article 310a, however, the antimicrobial region 334 is located substantially within layer 344, with no appreciable quantities of antimicrobial ions (e.g., $Ag^+$ ions) within the article 310a or at the first surface 312. As such, the antimicrobial region 334 of the article 310a can extend from the second surface 342 through the layer 344 to an antimicrobial depth 316. In article 310a, the antimicrobial depth 316 is located within the layer 344. It should be understood that some antimicrobial ions can be located below the depth 316 in layer 344 and/or in the article 310a at concentration levels that are not appreciable. According to some embodiments, the second surface 342 of the layer 344 of article 310a can have a concentration of antimicrobial ions (e.g., $Ag^+$ ions) that ranges from about 5% to about 70% by weight. In other embodiments, the second surface 342 has a concentration of antimicrobial ions that ranges from about 1% to about 50% by weight. According to an exemplary embodiment, the concentration of $Ag^+$ ions at the second surface 342 is from about 1% to about 40% by weight.

Antimicrobial articles 310, 310a can be fabricated according to the methods 100, 100b outlined in the foregoing description. Antimicrobial articles 310, 310a may also be fabricated according to protocols that are modified consistent with the methods 100, 100b as outlined in the foregoing. In some embodiments of antimicrobial articles 310, 310a, the first surface 312 is formed by a material removal process, e.g., touch polishing or acid etching treatments. In another embodiment, the first surface 312 is characterized by a surface morphology consistent with the removal of about 0.1 μm to about 2 μm from a touch polishing or acid etching surface treatment process. According to another embodiment, the compressive layer 324 contains a plurality of metal ions (e.g., $K^+$ ions) that have been exchanged and/or imparted into the article 310, 310a that contains smaller ion-exchangeable ions (e.g., $Na^+$ ions). As noted earlier, the first surface 312 can have a concentration of antimicrobial ions that ranges from about 5% to about 70%, or from about 1% to about 50% in some specific embodiments. It is further possible to construct antimicrobial article 310, 310a such that the first surface 312 contains a concentration of $Ag^+$ ions that ranges from about 20% to about 40% by weight. In some embodiments, the first surface 312 contains a concentration of $Ag^+$ ions that ranges from about 30% to about 40% by weight.

In some embodiments, the optical integrity of the antimicrobial articles is maintained such that the articles 310, 310a and layer 344 can be characterized by an optical transmittance of 88% or greater in the range of about 400 nm to about 750 nm. According to some embodiments, the optical transmittance of articles 310, 310a and layer 344 can be as high as 89%, 90%, 91%, 92%, or even higher values in the range of about 400 nm to about 750 nm. In addition, such articles 310, 310a can be fabricated according to methods 100, 100b or modifications of these methods consistent with the foregoing.

According to other embodiments, the layer 344 of the articles 310, 310a is expected to retain a water contact angle of at least 75° after the article has been subjected to 6,000 abrasion cycles or more. In some variants, the layer 344 should retain a water contact angle of at least 75° after the article 310, 310a has been subjected to at least 1,000, at least 2,000, at least 3,000, at least 4,000 or at least 5,000 abrasion cycles.

In an exemplary embodiment, the article 310, 310a includes other surfaces in addition to first surface 12 or first surface 12a such that any of these other surfaces and the first surfaces 12, 12a are expected to exhibit scratches that are less than about 2 mm in length after the article 310, 310a has been subjected to at least 8,000 abrasion cycles. In some embodiments, the article 310, 310a is expected to be characterized by an optical reflectance value and/or optical transmittance values that are substantially unchanged before and after at least 8,000 abrasion cycles. According to some variants, the article 310, 310a is expected to demonstrate substantial equivalence of any of the foregoing characteristics (e.g., crack propagation resistance, optical transmittance and/or optical reflectance) before and after being subjected to at least 1,000, at least 2,000, at least 3,000, at least 4,000, at least 5,000, at least 6,000, or at least 7,000 abrasion cycles.

EXAMPLE ONE

Figure 3:
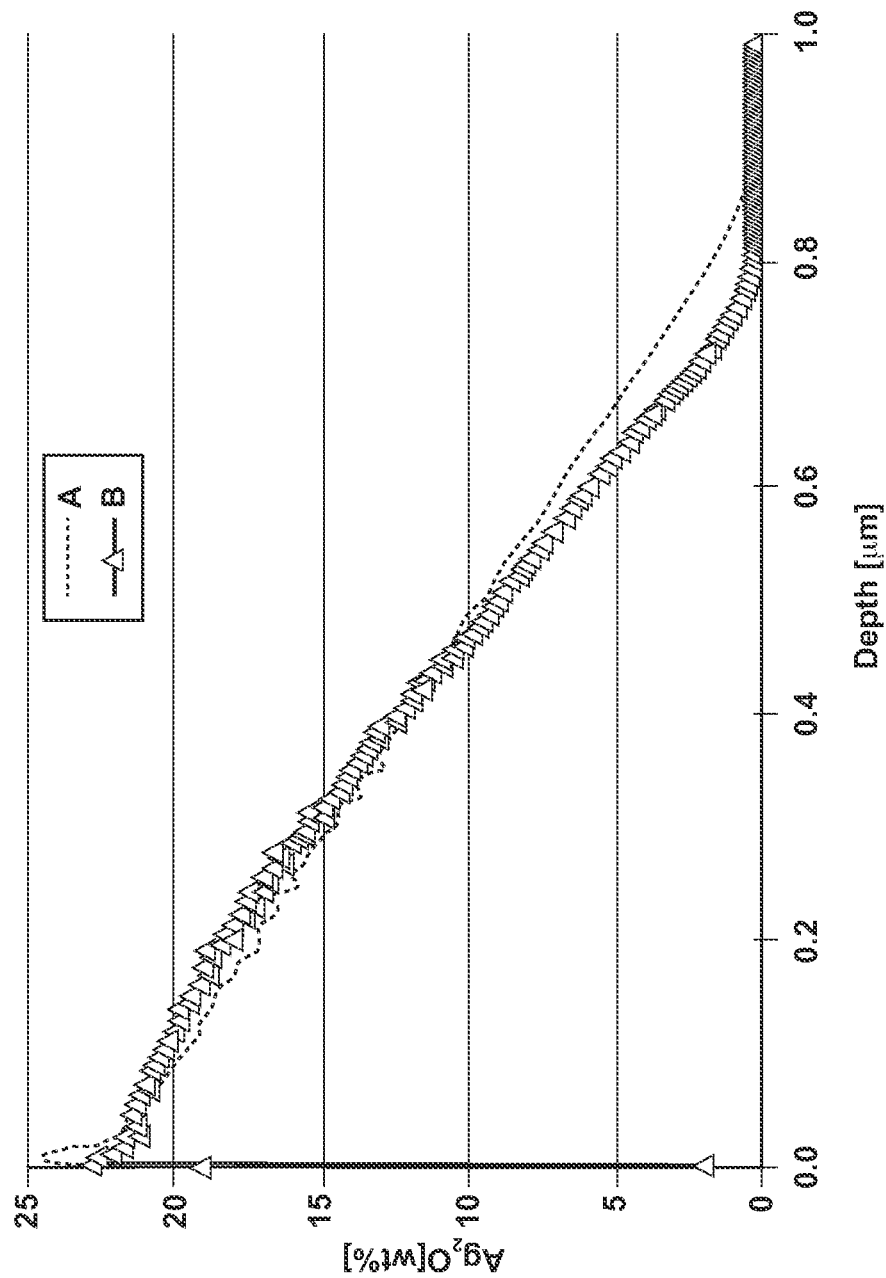
FIG. 3 is a secondary ion mass spectrometry ("SIMS") plot of $Ag^+$ ion concentration (by weight % $Ag_2O$) as a function of depth in a strengthened glass article with a hydrophobic coating deposited before or after an ion exchange process that incorporated $Ag^+$ ions into the article.

Referring to FIG. 3, a SIMS plot of $Ag^+$ ion concentration (by weight % $Ag_2O$) as a function of depth is depicted for two strengthened glass articles having a hydrophobic coating deposited before or after an antimicrobial ion exchange process that incorporated $Ag^+$ ions into the articles. The depth profile shown in FIG. 3 includes both the hydrophobic coating and the underlying glass article substrate. The two sets of strengthened, antimicrobial glass articles designated "A" and "B" were prepared as follows. The articles have an alkali aluminosilicate glass composition including about 68 mol % $SiO_2$, 4 mol % $B_2O_3$, about 13 mol % $Al_2O_3$, about 14 mol % $Na_2O$, about 2 mol % MgO and about 0.1 mol % $SnO_2$.

The "A" and "B" articles employed to generate the SIMS data depicted in FIG. 3 were subjected to a strengthening ion-exchange process employing a 100% KNO₃ molten salt bath at 420° C. for 5 hours to achieve a CS level >850 MPa and a DOL>35 μm. After strengthening, the glass articles were plasma cleaned and rinsed with deionized water. The articles were also dip-coated with a hydrophobic coating derived from a Dow Corning® 2634 Coating preparation (e.g., alkoxysilane in a fluorinated solvent) to develop an easy-to-clean polymeric surface on the glass articles having a thickness of approximately 5 nm. The "A" and "B" glass articles were also subjected to an antimicrobial ion exchange process at 250° C. for 30 minutes in a molten salt bath containing 50% AgNO₃ and 50% KNO₃.

Referring again to FIG. 3, the "A" group of antimicrobial articles was subjected to the antimicrobial ion exchange process before application of the hydrophobic coating. In contrast, the "B" group of antimicrobial articles was subjected to the antimicrobial ion exchange process after application of the hydrophobic coating. As the SIMS data demonstrates, the Ag⁺ ion concentration profile (as indicated by weight % Ag₂O) for the "A" and "B" groups is virtually identical. Hence, the antimicrobial ions (Ag⁺ ions) were successfully incorporated into the "B" group of glass articles through the hydrophobic coating in the "B" group, consistent with the methods 100, 100b and articles 310, 310a described in the foregoing. Further, the group "B" articles prepared with an antimicrobial ion exchange after coating deposition exhibited a comparable Ag⁺ concentration profile to the group "A" articles prepared with an antimicrobial ion exchange on the "bare" article not yet coated with the hydrophobic layer.

EXAMPLE TWO

Figure 4:
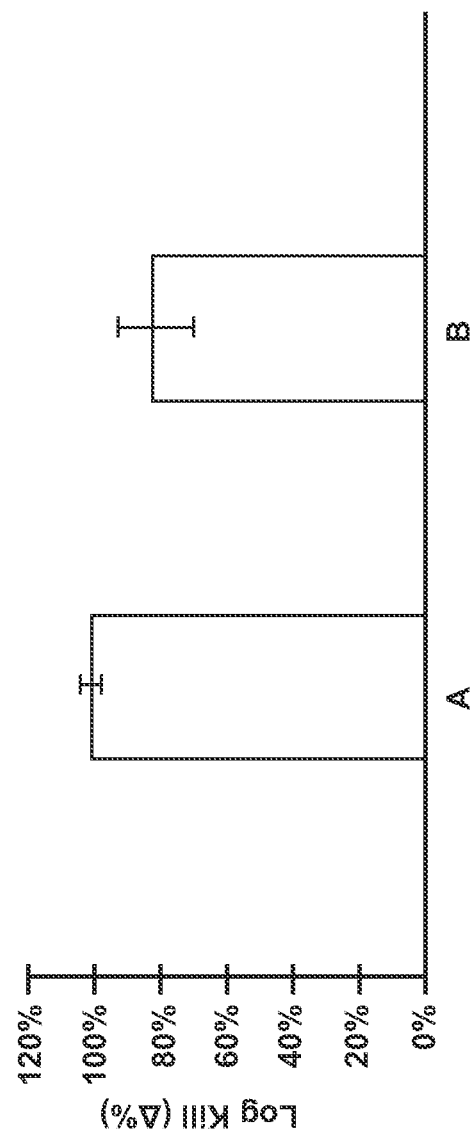
FIG. 4 is a bar chart depicting the results from antimicrobial efficacy testing of strengthened glass articles with and without a hydrophobic coating deposited before an ion exchange process that incorporated $Ag^+$ ions into the article.

Referring to FIG. 4, a bar chart depicts the results from antimicrobial testing of strengthened glass articles with and without a hydrophobic coating deposited before an ion exchange process that incorporated Ag⁺ ions into the article. The two sets of strengthened, antimicrobial glass articles designated "A" and "B" were prepared as follows. The articles have the same alkali aluminosilicate glass composition as the articles of Example 1.

The "A" and "B" articles employed to generate the efficacy depicted in FIG. 4 were subjected to a strengthening ion-exchange process employing a 100% KNO₃ molten salt bath at 420° C. for 5 hours to achieve a CS level >850 MPa and a DOL>35 μm. After strengthening, the glass articles were plasma cleaned and rinsed with deionized water. The "A" glass articles were then subjected to an antimicrobial ion exchange process at 250° C. for 30 minutes in a molten salt bath containing 50% AgNO₃ and 50% KNO₃. The "B" glass articles were also plasma cleaned and rinsed with deionized water after strengthening. The "B" articles were then dip-coated with a hydrophobic coating derived from a Dow Corning® 2634 Coating preparation (e.g., alkoxysilane in a fluorinated solvent) to develop an easy-to-clean polymeric surface on the glass articles having a thickness of approximately 5 nm. The coated "B" articles were again plasma cleaned and rinsed with deionized water. Finally, the "B" glass articles were subjected to an antimicrobial ion exchange process at 250° C. for 30 minutes in a molten salt bath containing 50% AgNO₃ and 50% KNO₃.

Referring again to FIG. 4, the "A" and "B" groups of articles were subjected to antimicrobial efficacy testing using a "dry" protocol with *Staphylococcus aureus* bacteria consistent with that described in U.S. Provisional Patent Application No. 61/908,401 and the foregoing description. As shown in FIG. 4, the log kill results for the "A" group of uncoated strengthened, antimicrobial articles is statistically equivalent to the "B" group of coated strengthened, antimicrobial articles. Note that the data from the "B" group shown in FIG. 4 is normalized to the results from the "A" group, set at 100%. As such, the method used to develop the "B" group of articles, which is consistent with the methods 100, 100b and the articles 310, 310a described in the foregoing, provided strengthened antimicrobial articles with a hydrophobic coating without a sacrifice in antimicrobial efficacy.

EXAMPLE THREE

Figure 5:
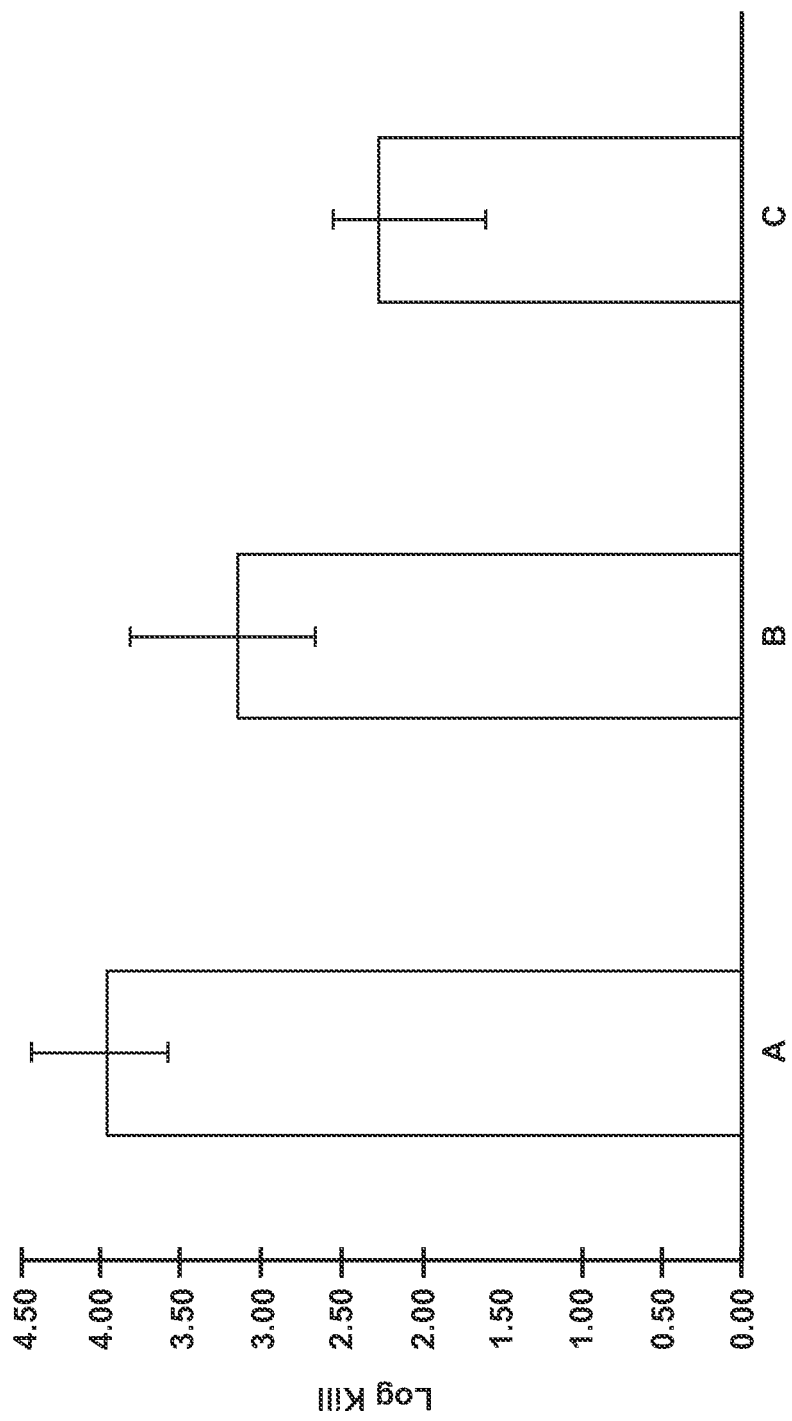
FIG. 5 is a bar chart depicting the results from antimicrobial efficacy testing of strengthened, antimicrobial glass articles without a hydrophobic coating and with a hydrophobic coating deposited before and after an ion exchange process that incorporated $Ag^+$ ions into the article.

Referring to FIG. 5, a bar chart depicts the results from antimicrobial testing of three groups of strengthened, antimicrobial glass articles with and without a hydrophobic coating. The strengthened, antimicrobial glass articles depicted in FIG. 5 are designated "A," "B" and "C" and were prepared as follows. All of the articles have the same alkali aluminosilicate glass composition as used in Example 1.

The "A," "B" and "C" articles employed to generate the efficacy data depicted in FIG. 5 were subjected to a strengthening ion-exchange process employing a 100% KNO₃ molten salt bath at 420° C. for 5 hours to achieve a CS level >850 MPa and a DOL>35 μm. After strengthening, all of the glass articles were plasma cleaned and rinsed with deionized water. The "A" and "B" groups of glass articles were then subjected to an antimicrobial ion exchange process at 230° C. for 20 minutes in a molten salt bath containing 50% AgNO₃ and 50% KNO₃. No hydrophobic or other coating was applied to the "A" group of glass articles. With regard to the "B" group, these glass articles were further processed with a hydrophobic coating after being subjected to the antimicrobial ion exchange process. In particular, the "B" group of articles were dip-coated with a hydrophobic coating derived from a Dow Corning® 2634 Coating preparation (e.g., alkoxysilane in a fluorinated solvent) to develop an easy-to-clean polymeric surface on the glass articles having a thickness of approximately 5 nm. With regard to the "C" group, these glass articles were processed a hydrophobic coating before being subjected to the antimicrobial ion exchange process. The hydrophobic coating and antimicrobial ion exchange process conditions employed in the "C" group of glass articles were otherwise the same as those employed in the "B" group of glass articles.

Referring again to FIG. 5, the "A," "B" and "C" groups of articles were subjected to antimicrobial efficacy testing using a "dry" protocol with *Staphylococcus aureus* bacteria consistent with that described in U.S. Provisional Patent Application No. 61/908,401 and the foregoing description. As shown in FIG. 5, the "A," "B" and "C" groups of strengthened, antimicrobial articles have average log kill values that exceed 3.5, 3 and 2, respectively. While the use of a hydrophobic coating in the "B" and "C" groups does appear to result in some loss in efficacy compared to the uncoated "A" group, the efficacy levels of the coated "B" and "C" groups are very high. More specifically, the "B" and "C" groups exhibit a kill rate of 99% or greater. Still further, the "C" group, exhibiting an average log kill rate that exceeds 99%, demonstrates that very good efficacy can be achieved in glass articles subjected to an antimicrobial ion exchange process after deposition of a hydrophobic coating. As such, the method used to develop the "C" group of articles, which is consistent with the methods 100, 100b and the articles 310, 310a described in the foregoing, provided strengthened antimicrobial articles with a hydrophobic coating with very good antimicrobial efficacy.

EXAMPLE FOUR

Figure 6A:
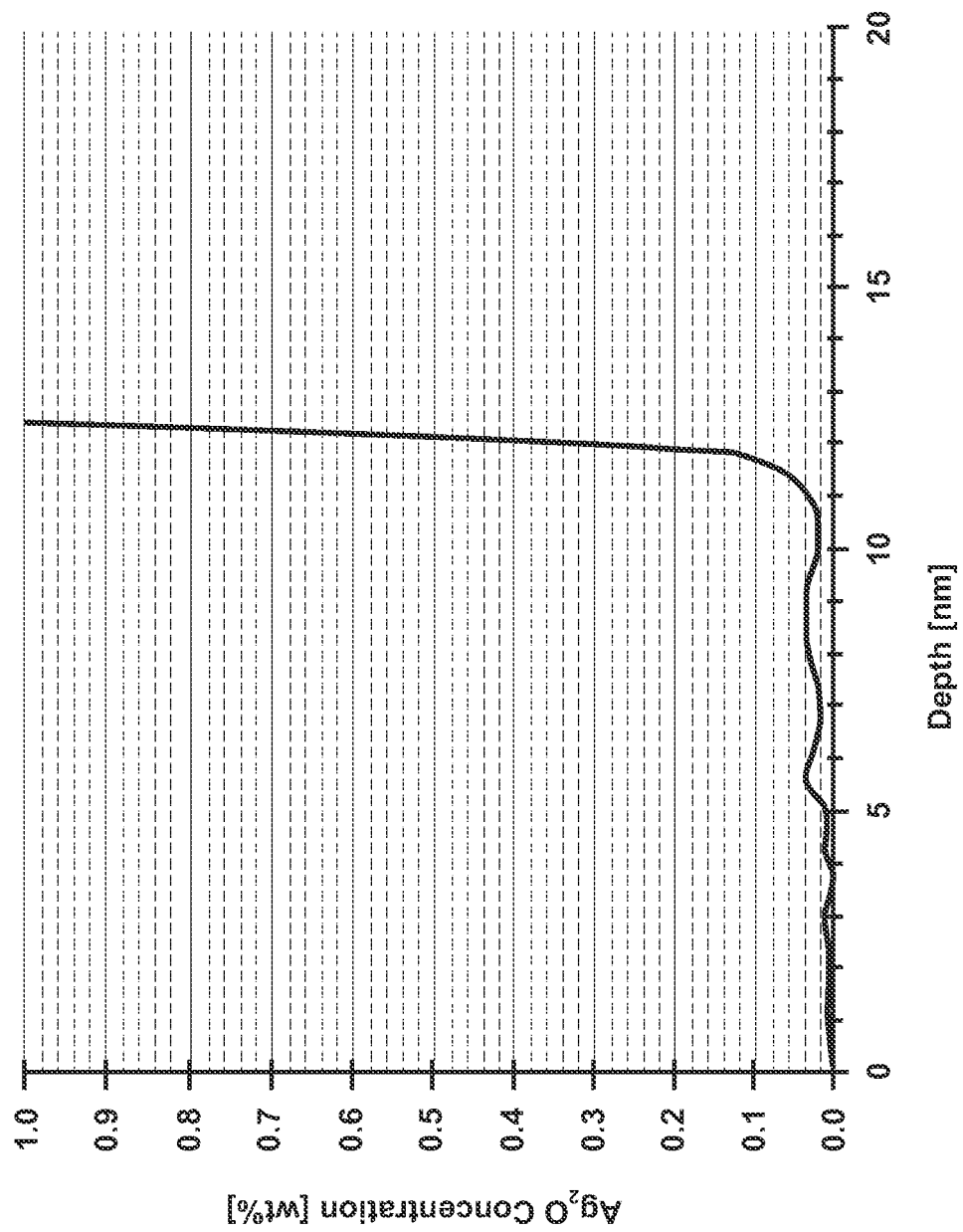
FIG. 6A is a SIMS plot of $Ag^+$ ion concentration (by weight % $Ag_2O$) as a function of coating depth in a strengthened glass article with a hydrophobic coating deposited after an ion exchange process that incorporated $Ag^+$ ions into the article.
Figure 6B:
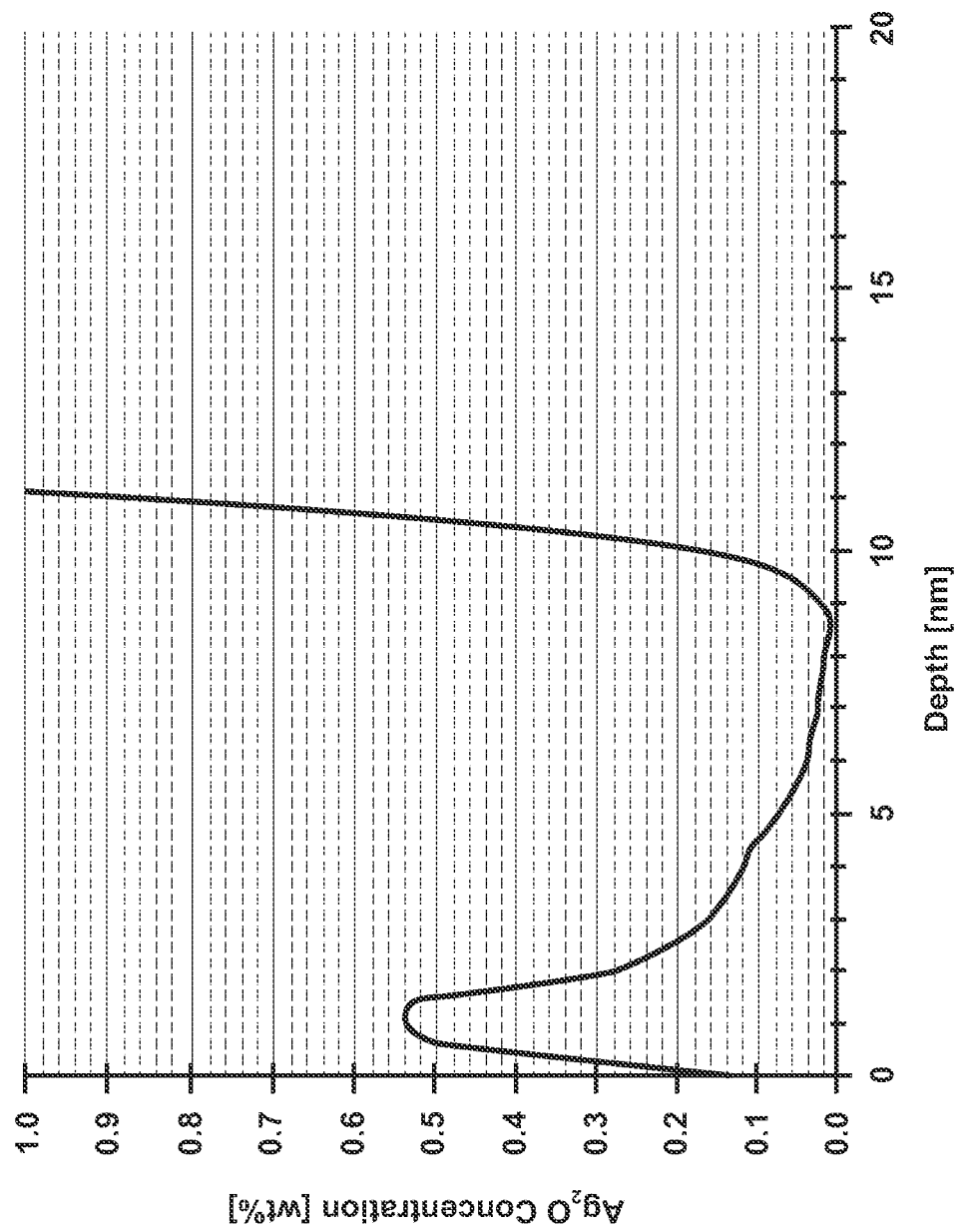
FIG. 6B is a SIMS plot of $Ag^+$ ion concentration (by weight % $Ag_2O$) as a function of coating depth in a strengthened glass article with a hydrophobic coating deposited before an ion exchange process that incorporated $Ag^+$ ions into the article.

Referring to FIGS. 6A and 6B, SIMS plots of $Ag^+$ ion concentration (by weight % $Ag_2O$) as a function of coating depth depict two strengthened glass articles having a hydrophobic coating deposited after and before an antimicrobial ion exchange process that incorporated $Ag^+$ ions into the articles, respectively. The depth profiles shown in FIGS. 6A and 6B are focused on the hydrophobic coating of the underlying glass article substrate as the X-axis is limited to a range of 0 to 20 nm.

The two sets of strengthened, antimicrobial glass articles used to develop the data in FIGS. 6A and 6B were prepared as follows. The articles have the same alkali aluminosilicate glass composition as used in Example 1. Both sets of glass articles were subjected to a strengthening ion-exchange process employing a 100% $KNO_3$ molten salt bath at 420° C. for 5 hours to achieve a CS level >850 MPa and a DOL>35 µm. After strengthening, the glass articles were plasma cleaned and rinsed with deionized water. The articles in FIGS. 6A and 6B were also subjected to a PVD process using electron beam deposition techniques to develop a hydrophobic coating having a target thickness of about 5 nm with an underlying silica primer having a target thickness of about 5 nm to 15 nm. In addition, these glass articles were also subjected to an antimicrobial ion exchange process at 390° C. for 60 minutes in a molten salt bath containing 0.5% $AgNO_3$ and 99.5% $KNO_3$. The articles in FIG. 6A were subjected to the antimicrobial ion exchange process before development of the hydrophobic coating and thus serve as a comparative example. In contrast, the articles in FIG. 6B were subjected to the antimicrobial ion exchange process after development of the hydrophobic coating.

Referring to FIG. 6A, the SIMS data of these comparative samples demonstrates that virtually no $Ag^+$ ions are present near the surface of the coating (at approximately 0 nm) with a very slight increase in $Ag^+$ ion concentration to about 0.02 to 0.04% $Ag_2O$ by weight as the glass surface is approached (at approximately 12 nm). It is possible that the increase in the concentration of $Ag^+$ ions near the interface between the hydrophobic coating and the underlying glass article is from some diffusion of the $Ag^+$ ions into the coating during the elevated temperatures associated with the deposition of the hydrophobic coating.

In FIG. 6B, the SIMS data of these glass articles demonstrates that appreciable amounts of $Ag^+$ ions, up to 0.54% $Ag_2O$ by weight, are present near the surface of the coating (at approximately 0 nm). These levels drop to close to zero at the likely interface between the hydrophobic coating and the underlying glass article (at ~9-10 nm depth) and then rise significantly (>1% $Ag_2O$ by weight) at 10 nm and greater depths. It is believed that the increase in the concentration of $Ag^+$ ions near the surface of the coating is associated with $Ag^+$ ions that remain in the coating after the glass article with the coating is immersed in the antimicrobial bath. Hence, the antimicrobial ion exchange process employed with a coated, strengthened glass article tends to leave some appreciable quantity of $Ag^+$ ions in both the coating and the underlying substrate. As such, the method used to develop the group of articles depicted in FIG. 6B, which is consistent with the methods 100, 100b and the articles 310, 310a described in the foregoing, provided strengthened antimicrobial articles with a hydrophobic coating having appreciable quantities of $Ag^+$ ions in the coating and the underlying substrate. Further, either or both of these sources of $Ag^+$ ions can contribute to the antimicrobial efficacy for these glass articles.

EXAMPLE FIVE

Table 1 below provides a comparison of water contact angle measurements on coated strengthened, glass articles with and without an antimicrobial ion exchange step after deposition of the coating. In particular, two sets of strengthened glass articles designated "A" and "B" were prepared as follows. The articles have the same alkali aluminosilicate glass composition as used in Example 1. Further, the "A" and "B" articles employed to generate the water angle data listed in Table 1 were subjected to a strengthening ion-exchange process employing a 100% $KNO_3$ molten salt bath at 420° C. for 5 hours to achieve a CS level >850 MPa and a DOL>35 µm. After strengthening, the glass articles were plasma cleaned and rinsed with deionized water. Further, the "A" and "B" group of articles were subjected to a PVD process using electron beam deposition techniques to develop a hydrophobic coating having a thickness of about 5 nm with a silica primer having a thickness of about 5 nm to 15 nm.

Referring again to Table 1, the "B" glass articles were also subjected to an antimicrobial ion exchange process at 250° C. for 30 minutes in a molten salt bath containing 50% $AgNO_3$ and 50% $KNO_3$. The "A" group of glass articles served as a control in the sense that it was not subjected to an antimicrobial ion exchange process. As indicated by the table, water contact measurements between the "A" and "B" groups were nearly the same. As such, the method used to develop the "B" group of articles, which are consistent with the methods 100, 100b and the articles 310, 310a described in the foregoing, provided strengthened antimicrobial articles with a hydrophobic coating without impacting the integrity (e.g., stability of surface energy) of the hydrophobic coating in terms of observed water contact angle. That is, the injection of antimicrobial $Ag^+$ ions through the hydrophobic coating in the "B" group of articles did not impact the ability of the hydrophobic coating to perform as required with regard to surface energy retention.

TABLE 1

| Test # | $\theta_L$ (°) | $\theta_R$ (°) | $\theta_M$ (°) |
|---|---|---|---|
| A strengthened glass w/coating | | | |
| 1 | 116.5 | 116.6 | 116.5 ± 0.05 |
| 2 | 116.5 | 116.6 | 116.6 |
| 3 | 114.5 | 114.7 | 114.6 ± 0.11 |
| 4 | 114 | 114.2 | 114.1 ± 0.07 |
| 5 | 115.5 | 115.2 | 115.4 ± 0.17 |
| Average | 115.4 | 115.5 | 115.4 |
| B strengthened glass w/coating and $Ag^+$ ions injected through coating | | | |
| 1 | 112.1 | 112.4 | 112.3 ± 0.12 |
| 2 | 113.1 | 113.5 | 113.3 ± 0.17 |
| 3 | 114.4 | 115 | 114.7 ± 0.27 |
| 4 | 115.3 | 115.3 | 115.3 |
| 5 | 115.5 | 115.8 | 115.6 ± 0.14 |
| Average | 114.1 | 114.4 | 114.2 |

It will be apparent to those skilled in the art that various modifications and variations can be made without departing from the spirit or scope of the claims.

What is claimed is:

1. An antimicrobial article, comprising:
a substrate having a first surface;
a layer disposed on the first surface, the layer defining a second surface;
a compressive stress region extending from the first surface of the substrate to a first depth in the substrate; and
an antimicrobial region comprising a plurality of $Ag^+$ ions extending from the second surface of the layer to a second depth in the substrate, the second depth at approximately 3 μm or less from the first surface of the substrate,
wherein the first surface of the substrate has a concentration of $Ag^+$ ions in the range from about 1% by weight to about 50% by weight.

2. The article of claim 1, wherein the substrate comprises a glass, glass-ceramic or ceramic composition.

3. The article of claim 1, wherein the layer comprises at least one coating selected from the group consisting of an anti-smudge coating, an anti-fingerprint coating, and an easy-to-clean coating.

4. The article claim 1, wherein the second depth is set at approximately 1 μm or less from the first surface of the substrate.

5. The article of claim 1, wherein the first surface is substantially free of strength-reducing defects, and wherein the substrate and the layer are each characterized by an optical transmittance of 88% or greater in the range of about 400 nm to 750 nm.

6. The article of claim 1, wherein a majority of the plurality of $Ag^+$ ions extending from the second surface of the layer to a second depth in the substrate is in a non-reduced state.

7. The article of claim 1, further wherein the article exhibits any one of:
a log kill rate of 5 or greater of at least *Staphylococcus aureus, Enterobacter aerogenes*, and *Pseudomonas aeruginosa* bacteria under JIS Z 2801 (2000) testing conditions,
a log kill rate of 3 or greater of at least *Staphylococcus aureus, Enterobacter aerogenes*, and *Pseudomonas aeruginosa* bacteria under modified JIS Z 2801 (2000) testing conditions, wherein the modified conditions comprise maintaining the antimicrobial glass article at a temperature of about 23° C. at a humidity of about 42% for about 24 hours, and
at a log kill rate of 2 or greater as tested by a test comprising:
(a) inoculating nutrient agar with a portion of a stock having a plurality of bacterial organisms to form a culture;
(b) incubating the culture to form a first incubated culture, incubating a portion of the first incubated culture with nutrient agar to form a second incubated culture, incubating a portion of the second incubated culture with nutrient agar to form a third incubated culture, and incubating the third incubated culture for approximately 48 hours to form an inoculated test plate with a plurality of bacterial colonies;
(c) forming an inoculum by suspending a portion of the plurality of bacterial colonies in a buffered test solution, adjusting the test solution to a pH of approximately 7 to 8, and adding an organic soil serum at a concentration of approximately 10% to 30% by weight to the test solution;
(d) inoculating the antimicrobial region of the antimicrobial article with a portion of the inoculum;
(e) incubating the inoculated antimicrobial article for at least approximately two hours; and
(f) washing the incubated and inoculated antimicrobial article in a neutralizing solution to form a residual test inoculum, counting the number of surviving bacterial colonies per volume in the residual test inoculum, and calculating the percent reduction in the number of surviving bacterial colonies in the residual test inoculum relative to a residual control inoculum.

8. The article of claim 1, wherein the layer is further characterized by a water contact angle of at least 75° after the article has been subjected to 6,000 abrasion cycles.

9. The article of claim 1, wherein the substrate further comprises other surfaces, and further wherein the other surfaces and the first surface comprise scratches that are less than 2 mm in length after the article has been subjected to 8,000 abrasion cycles.

10. The article of claim 1, wherein the article either one or both
an optical reflectance value before and a value after at least 8,000 abrasion cycles, wherein the optical reflectance values are substantially equivalent, and
an optical transmission value before and a value after at least 8,000 abrasion cycles, wherein the optical transmission values are substantially equivalent.

11. An antimicrobial article, comprising:
a substrate having a first surface;
a layer disposed on the first surface, the layer defining a second surface and a bottom surface;
a compressive stress region extending from the first surface of the substrate to a first depth in the substrate; and
an antimicrobial region comprising a plurality of $Ag^+$ ions extending only from the second surface of the layer to a second depth in the layer above the bottom surface,
wherein the second surface of the layer has a concentration of $Ag^+$ ions in the range from about 1% by weight to about 50% by weight.

12. The article of claim 11, wherein the substrate consists essentially of a glass, glass-ceramic or ceramic composition.

13. The article of claim 11, wherein the layer comprises at least one coating selected from the group consisting of an anti-smudge coating, an anti-fingerprint coating, and an easy-to-clean coating.

14. The article of claim 11, further wherein the article exhibits any one of:
a log kill rate of 5 or greater of at least *Staphylococcus aureus, Enterobacter aerogenes*, and *Pseudomonas aeruginosa* bacteria under JIS Z 2801 (2000) testing conditions,
a log kill rate of 3 or greater of at least *Staphylococcus aureus, Enterobacter aerogenes*, and *Pseudomonas aeruginosa* bacteria under modified JIS Z 2801 (2000) testing conditions, wherein the modified conditions comprise maintaining the antimicrobial glass article at a temperature of about 23° C. at a humidity of about 42% for about 24 hours, and
at a log kill rate of 2 or greater as tested by a test comprising:
(a) inoculating nutrient agar with a portion of a stock having a plurality of bacterial organisms to form a culture;
(b) incubating the culture to form a first incubated culture, incubating a portion of the first incubated culture with nutrient agar to form a second incubated culture, incubating a portion of the second incubated culture with nutrient agar to form a third incubated culture, and incubating the third incubated culture for approximately 48 hours to form an inoculated test plate with a plurality of bacterial colonies;

(c) forming an inoculum by suspending a portion of the plurality of bacterial colonies in a buffered test solution, adjusting the test solution to a pH of approximately 7 to 8, and adding an organic soil serum at a concentration of approximately 10% to 30% by weight to the test solution;

(d) inoculating the antimicrobial region of the antimicrobial article with a portion of the inoculum;

(e) incubating the inoculated antimicrobial article for at least approximately two hours; and (f) washing the incubated and inoculated antimicrobial article in a neutralizing solution to form a residual test inoculum, counting the number of surviving bacterial colonies per volume in the residual test inoculum, and calculating the percent reduction in the number of surviving bacterial colonies in the residual test inoculum relative to a residual control inoculum.

15. A method of making an antimicrobial article, comprising the steps:

providing an article comprising a glass, glass-ceramic or ceramic composition and having a first surface and a plurality of ion-exchangeable metal ions;

providing a strengthening bath comprising a plurality of ion-exchanging metal ions larger in size than the ion-exchangeable metal ions;

providing an antimicrobial bath comprising a plurality of antimicrobial ions, a plurality of the ion-exchangeable metal ions and a plurality of the ion-exchanging ions;

submersing the article in the strengthening bath to exchange a portion of the plurality of ion-exchangeable metal ions in the article with a portion of the plurality of the ion-exchanging metal ions in the strengthening bath to form a compressive stress region extending from the first surface to a first depth in the article;

forming a layer on the first surface of the article, the layer arranged over the compressive stress region and defining a second surface; and submersing the article and the layer in the antimicrobial bath to exchange a portion of the ion-exchangeable and the ion-exchanging metal ions in the compressive stress region with a portion of the plurality of the antimicrobial ions in the antimicrobial bath to impart an antimicrobial region comprising a plurality of antimicrobial ions extending from the second surface of the layer to a second depth in the article, wherein the antimicrobial ions are $Ag^+$ ions, and further wherein the second depth is at approximately 1 µm or less from the first surface of the article, and the first surface of the article has a concentration of $Ag^+$ ions in the range from about 1% by weight to about 50% by weight.

16. The method of claim 15, wherein the layer comprises at least one coating selected from the group consisting of an anti-smudge coating, an anti-fingerprint coating, and an easy-to-clean coating.

17. The method of claim 15, wherein the second depth is at approximately 3 µm or less from the first surface of the article.

18. The method of claim 15, wherein a majority of the plurality of $Ag^+$ ions extending from the second surface of the layer to a second depth in the article is in a non-reduced state.

* * * * *